US011356796B2

United States Patent
Olivieri et al.

(10) Patent No.: US 11,356,796 B2
(45) Date of Patent: Jun. 7, 2022

(54) PRIORITY-BASED SOUNDFIELD CODING FOR VIRTUAL REALITY AUDIO

(71) Applicant: QUALCOMM Incorporated, San Diego, CA (US)

(72) Inventors: Ferdinando Olivieri, San Diego, CA (US); Taher Shahbazi Mirzahasanloo, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/951,636

(22) Filed: Nov. 18, 2020

(65) Prior Publication Data

US 2021/0160644 A1 May 27, 2021

Related U.S. Application Data

(60) Provisional application No. 62/939,470, filed on Nov. 22, 2019.

(51) Int. Cl.
*H04S 7/00* (2006.01)
*H04S 3/00* (2006.01)
*G06T 19/00* (2011.01)

(52) U.S. Cl.
CPC ............ *H04S 7/304* (2013.01); *G06T 19/003* (2013.01); *H04S 3/008* (2013.01); *H04S 7/307* (2013.01)

(58) Field of Classification Search
USPC ..................................... 381/55, 58, 150, 310
See application file for complete search history.

(56) References Cited

U.S. PATENT DOCUMENTS

| 10,657,974 | B2 | 5/2020 | Kim et al. |
| 2011/0249821 | A1 | 10/2011 | Jaillet et al. |
| 2018/0115850 | A1 | 4/2018 | De Burgh et al. |
| 2018/0206057 | A1 | 7/2018 | Kim et al. |
| 2019/0007781 | A1 | 1/2019 | Peters et al. |
| 2019/0198028 | A1* | 6/2019 | Kim ..................... G10L 19/167 |
| 2019/0222798 | A1 | 7/2019 | Honma et al. |
| 2020/0174262 | A1* | 6/2020 | Godar ................... G06T 15/205 |

OTHER PUBLICATIONS

Agarwal R., "Object Detection: An End to End Theoretical Perspective", Sep. 22, 2018, 15 pages.

(Continued)

*Primary Examiner* — Yosef K Laekemariam
(74) *Attorney, Agent, or Firm* — Shumaker & Sieffert, P.A.

(57) ABSTRACT

An example device configured to obtain image data includes a memory configured to store one or more priority values, each of the one or more priority values being associated with a type of image object associated with the image data. The device includes one or more processors coupled to the memory, and configured to associate image objects in the image data with one or more audio sources represented in one or more audio streams. The one or more processors are also configured to assign a respective priority value to each of the one or more audio sources represented in the one or more streams and code ambisonic coefficients based on the assigned priority value.

26 Claims, 13 Drawing Sheets

(56) References Cited

OTHER PUBLICATIONS

Audio: "Call for Proposals for 3D Audio", International Organisation for Standardisation Organisation Internationale De Normalisation, ISO/IEC JTC1/SC29/WG11, Coding of Moving Pictures and Audio, ISO/IEC JTC1/SC29/WG11/N13411, Geneva, CH, Jan. 2013, pp. 1-20.
ETSI TS 103 589 V1.1.1, "Higher Order Ambisonics (HOA) Transport Format", Jun. 2018, 33 pages.
Felzenszwalb P.F., et al., "Efficient Graph-Based Image Segmentation", International Journal of Computer Vision, vol. 59, No. 2, Sep. 2004, pp. 1-26.
Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.
Hollerweger F., "An Introduction to Higher Order Ambisonic", Oct. 2008, pp. 1-13, Accessed online [Jul. 8, 2013].
"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.
"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.
ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Peterson J., et al., "Virtual Reality, Augmented Reality, and Mixed Reality Definitions", EMA, version 1.0, Jul. 7, 2017, 4 Pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting, Jan. 13-17, 2014, San Jose, (Motion Picture Expert Group or ISO/IEC JTC1/SC29/WG11), No. M31827, Jan. 11, 2014 (Jan. 11, 2014), San Jose, USA, XP030060280, 83 Pages.
Sen D., et al., "Technical Description of the Qualcomm's HoA Coding Technology for Phase II", 109th MPEG Meeting, Jul. 7-Nov. 7, 2014, Sapporo, JP (Motion Picture Expert Group or ISO/IEC JTC1/SC29/WG11), No. M34104, Jul. 2, 2014 (Jul. 2, 2014), XP030062477,4 Pages.
International Search Report and Written Opinion—PCT/US2020/061268—ISA/EPO—dated Mar. 3, 2021.

\* cited by examiner

PRIORITY-BASED SOUNDFIELD CODING FOR VIRTUAL REALITY AUDIO

This application claims priority to U.S. Provisional Application No. 62/939,470, filed Nov. 22, 2019, the entire content of which is hereby incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems is generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture and rendering of an acoustical space for extended reality systems.

In one example, various aspects of the techniques are directed to a device configured to obtain image data comprising a memory configured to store one or more priority values, each of the one or more priority values being associated with a type of image object associated with the image data, and one or more processors coupled to the memory, and configured to: associate image objects in the image data with one or more audio sources represented in one or more audio streams; assign a respective priority value to each of the one or more audio sources represented in the one or more audio streams; and code ambisonic coefficients based on the assigned priority value.

In another example, various aspects of the techniques are directed to a method of obtaining image data comprising: storing, by a memory, one or more priority values, each of the one or more priority values being associated with a type of image object associated with the image data; associating, by one or more processors, image objects in the image data with one or more audio sources represented in one or more audio streams; assigning, by the one or more processors, a respective priority value to each of the one or more audio sources represented in the one or more audio streams; and coding, by the one or more processors, ambisonic coefficients based on the assigned priority value.

In another example, various aspects of the techniques are directed to a device configured to obtain image data, the device comprising: means for storing one or more priority values, each of the one or more priority values being associated with a type of image object associated with the image data; means for associating image objects in the image data with one or more audio sources represented in one or more audio streams; means for assigning a respective priority value to each of the one or more audio sources represented in the one or more audio streams; and means for coding ambisonic coefficients based on the assigned priority value.

In another example, various aspects of the techniques are directed to a non-transitory computer-readable storage medium having stored thereon instructions that, when executed, cause one or more processors to: store a one or more priority values, each of the one or more priority values being associated with a type of image object associated with the image data; associate image objects in the image data with one or more audio sources represented in one or more audio streams; assign a respective priority value to each of the one or more audio sources represented in the one or more audio streams; and code ambisonic coefficients based on the assigned priority value.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
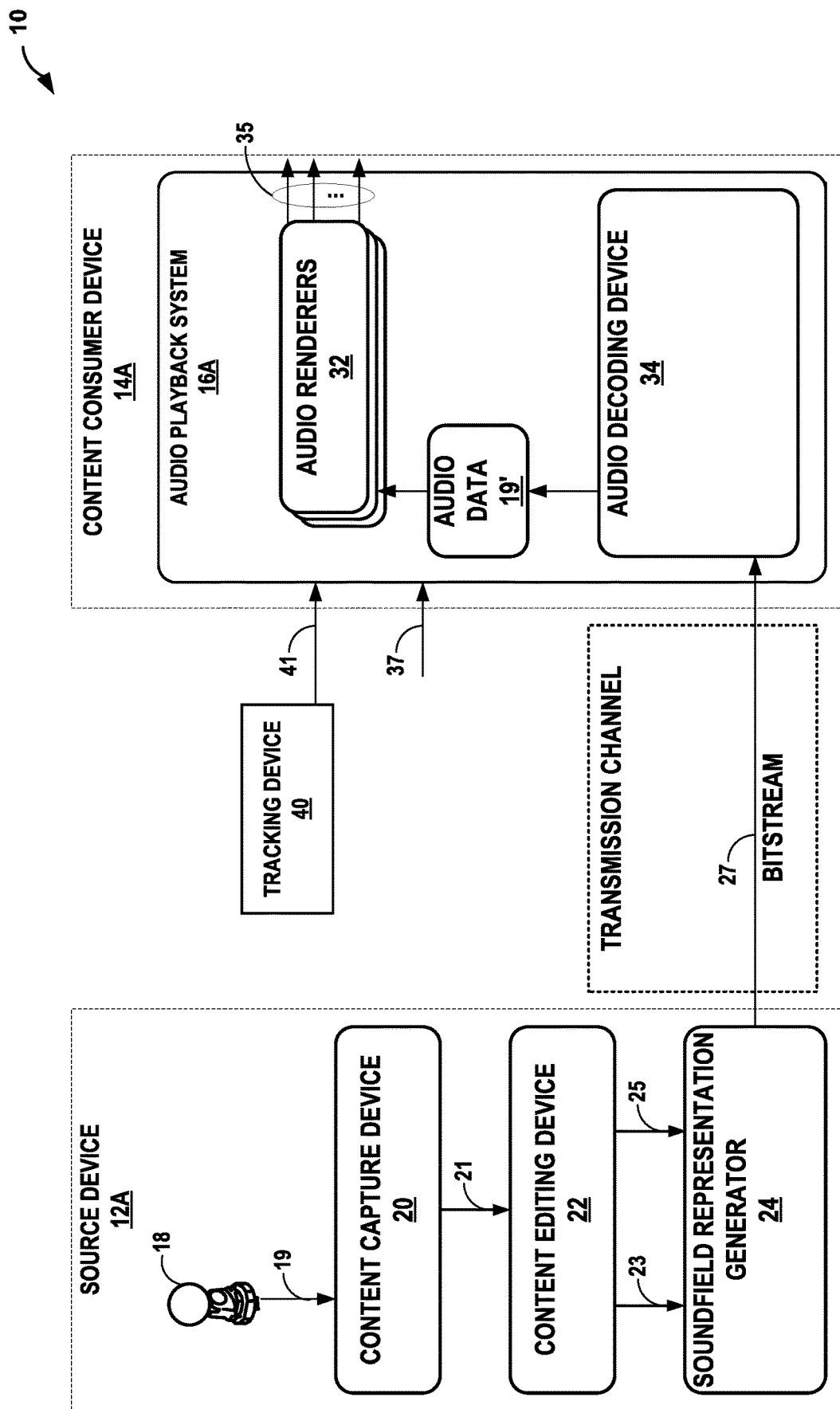
FIGS. 1A-1C are diagrams illustrating systems that may perform various aspects of the techniques described in this disclosure.

Audio decoding does not account for visual scene elements to determine the priority of decoding one or more audio streams. For example, audio streams associated with various visual elements may all be of the same priority. This may lead to a wasteful use of processing power (e.g., computations), bandwidth and battery life by prioritizing unimportant audio streams at the same level as audio streams that are of more interest to a user of an audio decoding device or to a content creator.

According to the techniques of this disclosure, image objects in the image data may be associated with one or more audio sources represented in one or more audio streams and a priority value may be assigned to the one or more audio sources represented in the one or more streams. In some examples, different numbers of ambisonic coefficients may be coded based on the assigned priority value. For example, one or more audio streams associated with people talking nearby the user may have a higher priority value assigned to them than one or more audio streams associated with a tree. In this manner, the techniques of this disclosure provide a way to save processing power, bandwidth and battery life by prioritizing audio streams based on associated visual objects. As used herein, to code may mean to encode or to decode.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include information, such as metadata, identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of objects that define the soundfield in three dimensions. One example of a hierarchical set of objects is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$ Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate three-dimensional (3D) localization of sound sources within the soundfield. As such, XR devices may render the ambisonic coefficients to speaker feeds that, when played via one or more speakers, accurately reproduce the soundfield.

As another example, the ambisonic coefficients may be translated (e.g., rotated) to account for user movement without overly complex mathematical operations, thereby potentially accommodating the low latency requirements of XR. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the displayed world (which may be associated with an acoustical space) via a screen, which may be mounted to the head of the user 102 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world). Additionally, while a displayed world is mentioned in various examples of the present disclosure, the techniques of this disclosure may also be used with an acoustical space that does not correspond to a displayed world or where there is no displayed world.

Figure 1B:
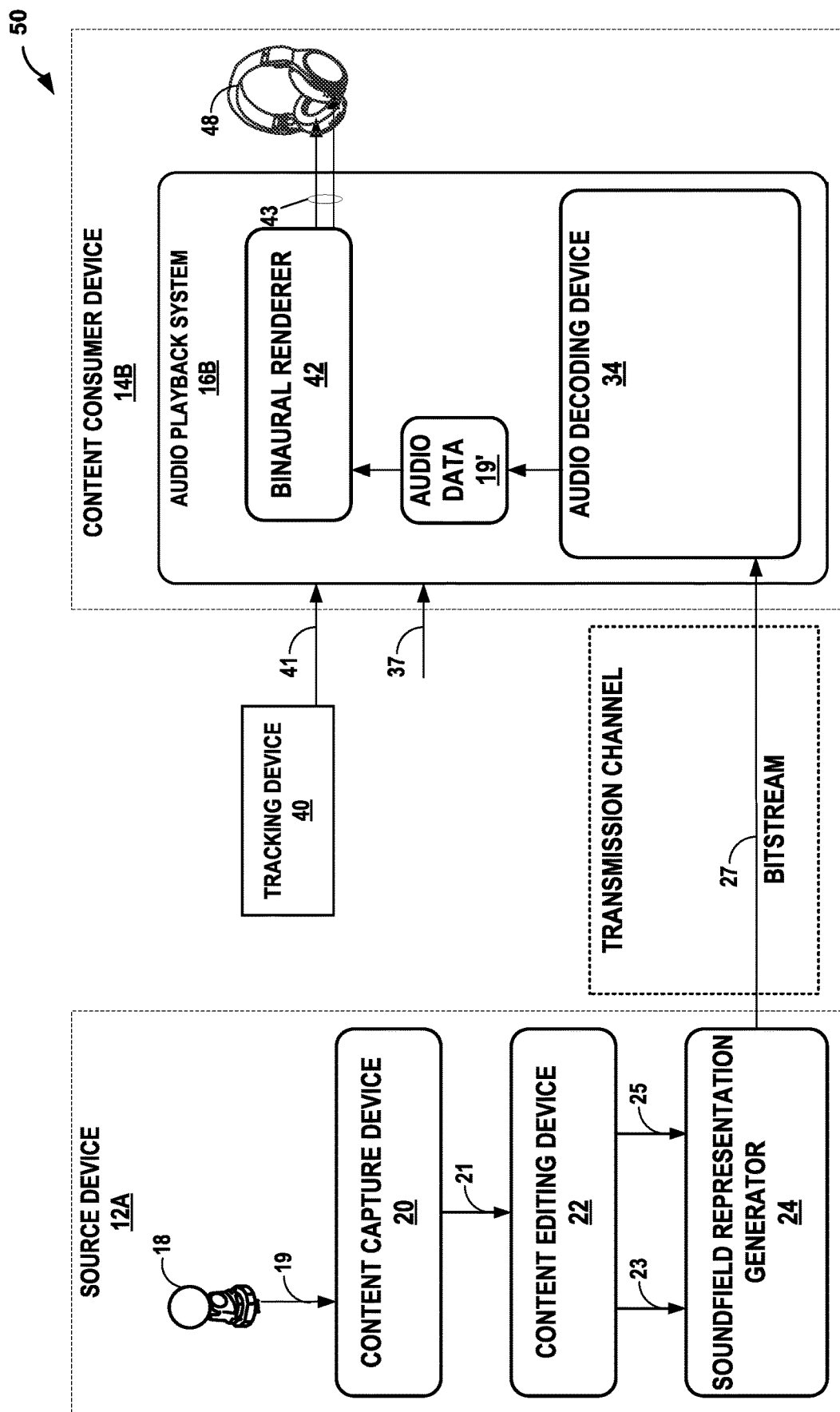
Figure 1C:
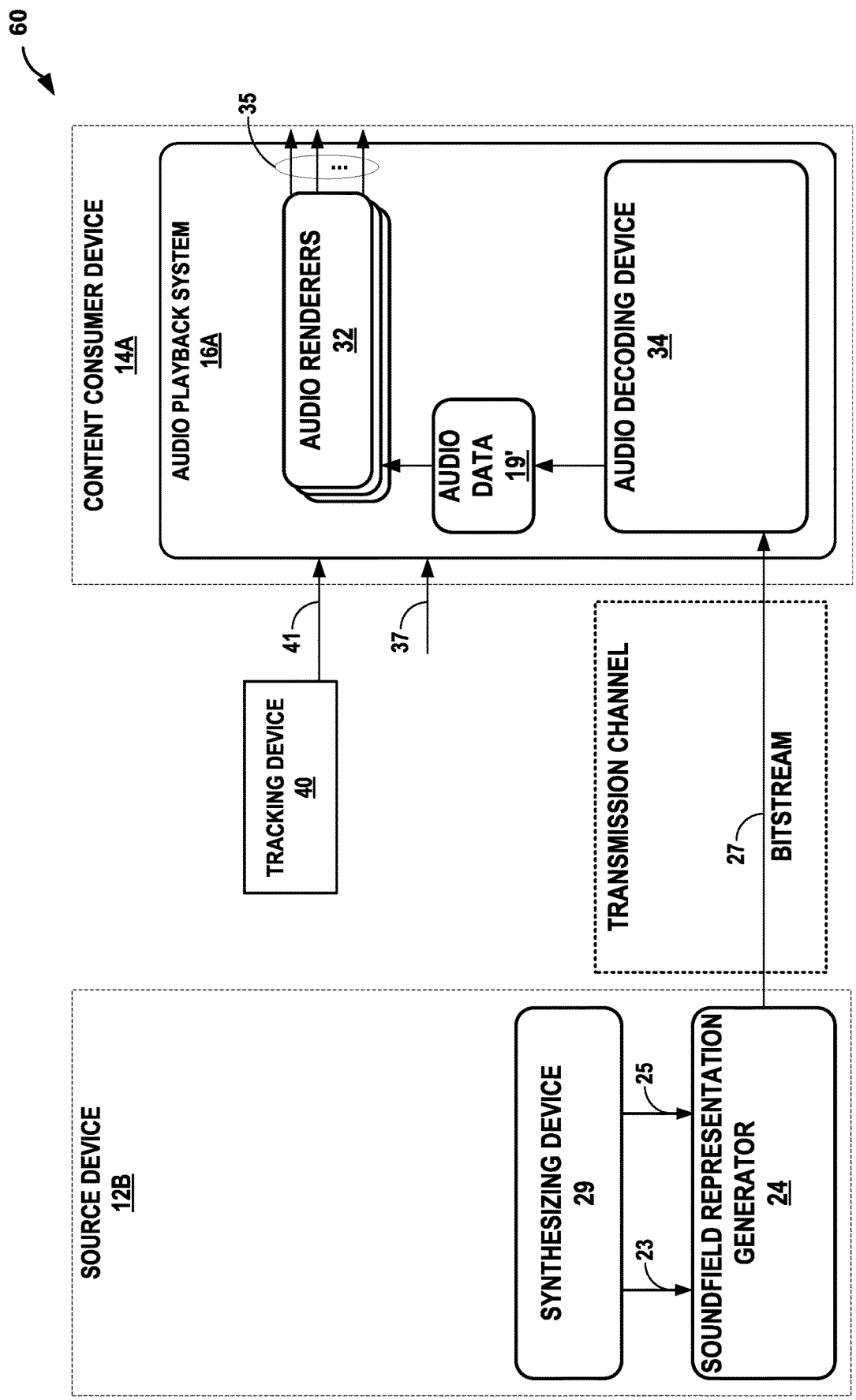

FIGS. 1A-1C are diagrams illustrating systems that may perform various aspects of the techniques described in this disclosure. As shown in the example of FIG. 1A, system 10 includes a source device 12 and a content consumer device 14. While described in the context of the source device 12 and the content consumer device 14, the techniques may be implemented in any context in which any representation of a soundfield is encoded to form a bitstream representative of the audio data. Moreover, the source device 12 may represent any form of computing device capable of generating the representation of a soundfield, and is generally described herein in the context of being a VR content creator device. Likewise, the content consumer device 14 may represent any form of computing device capable of implementing rendering techniques described in this disclosure as well as audio playback, and is generally described herein in the context of being a VR client device.

The source device 12 may be operated by an entertainment company or other content creator that may generate multi-channel audio content for consumption by operators of content consumer devices, such as the content consumer device 14. In some VR scenarios, the source device 12 generates audio content in conjunction with video content. The source device 12 includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as the audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via the microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter the content 21 received from the content capture device 20, including the audio data 19. The content editing device 22 may output edited content 23 and associated audio information 25, such as metadata, to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and the audio information 25, provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the edited content 23 and the audio information 25.

For instance, to generate the different representations of the soundfield using ambisonic coefficients (which again is one example of the audio data 19), the soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 302 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

In some examples, the soundfield representation generator 24 may represent an audio encoder configured to compress or otherwise reduce a number of bits used to represent the content 21 in the bitstream 27. Although, while not shown, in some examples soundfield representation generator may include a psychoacoustic audio encoding device that conforms to any of the various standards discussed herein.

In this example, the soundfield representation generator 24 may apply SVD to the ambisonic coefficients to determine a decomposed version of the ambisonic coefficients. The decomposed version of the ambisonic coefficients may include one or more of predominant audio signals and one or more corresponding spatial components describing spatial characteristics, e.g., a direction, shape, and width, of the associated predominant audio signals. As such, the soundfield representation generator 24 may apply the decomposition to the ambisonic coefficients to decouple energy (as represented by the predominant audio signals) from the spatial characteristics (as represented by the spatial components).

The soundfield representation generator 24 may analyze the decomposed version of the ambisonic coefficients to identify various parameters, which may facilitate reordering of the decomposed version of the ambisonic coefficients. The soundfield representation generator 24 may reorder the decomposed version of the ambisonic coefficients based on the identified parameters, where such reordering may improve coding efficiency given that the transformation may reorder the ambisonic coefficients across frames of the ambisonic coefficients (where a frame commonly includes M samples of the decomposed version of the ambisonic coefficients and M is, in some examples).

After reordering the decomposed version of the ambisonic coefficients, the soundfield representation generator 24 may select one or more of the decomposed versions of the ambisonic coefficients as representative of foreground (or, in other words, distinct, predominant or salient) components of the soundfield. The soundfield representation generator 24 may specify the decomposed version of the ambisonic coefficients representative of the foreground components (which may also be referred to as a "predominant sound signal," a "predominant audio signal," or a "predominant sound component") and associated directional information (which may also be referred to as a "spatial component" or, in some instances, as a so-called "V-vector" that identifies spatial characteristics of the corresponding audio object). The spatial component may represent a vector with multiple different objects (which in terms of a vector may be referred to as "coefficients") and thereby may be referred to as a "multidimensional vector."

The soundfield representation generator 24 may next perform a soundfield analysis with respect to the ambisonic coefficients in order to, at least in part, identify the ambisonic coefficients representative of one or more background (or, in other words, ambient) components of the soundfield. The background components may also be referred to as a "background audio signal" or an "ambient audio signal." The soundfield representation generator 24 may perform energy compensation with respect to the background audio signal given that, in some examples, the background audio signal may only include a subset of any given sample of the ambisonic coefficients (e.g., such as those corresponding to zero and first order spherical basis functions and not those corresponding to second or higher order spherical basis functions). When order-reduction is performed, in other words, the soundfield representation generator 24 may augment (e.g., add/subtract energy to/from) the remaining background ambisonic coefficients of the ambisonic coefficients to compensate for the change in overall energy that results from performing the order reduction.

The soundfield representation generator 24 may next perform a form of interpolation with respect to the foreground directional information (which is another way of referring to the spatial components) and then perform an order reduction with respect to the interpolated foreground directional information to generate order reduced foreground directional information. The soundfield representation generator 24 may further perform, in some examples, a quantization with respect to the order reduced foreground directional information, outputting coded foreground directional information. In some instances, this quantization may comprise a scalar/entropy quantization possibly in the form of vector quantization. The soundfield representation generator 24 may then output the intermediately formatted audio data as the background audio signals, the foreground audio signals, and the quantized foreground directional information, to in some examples a psychoacoustic audio encoding device.

In any event, the background audio signals and the foreground audio signals may comprise transport channels in some examples. That is, the soundfield representation generator 24 may output a transport channel for each frame of the ambisonic coefficients that includes a respective one of the background audio signals (e.g., M samples of one of the ambisonic coefficients corresponding to the zero or first order spherical basis function) and for each frame of the foreground audio signals (e.g., M samples of the audio objects decomposed from the ambisonic coefficients). The soundfield representation generator 24 may further output side information (which may also be referred to as "sideband information") that includes the quantized spatial components corresponding to each of the foreground audio signals.

Collectively, the transport channels and the side information may be represented in the example of FIG. 1A as ambisonic transport format (ATF) audio data (which is another way to refer to the intermediately formatted audio data). In other words, the AFT audio data may include the transport channels and the side information (which may also be referred to as "metadata"). The ATF audio data may conform to, as one example, an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06). As such, the ATF audio data may be referred to as HTF audio data.

The soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

In the example where the soundfield representation generator 24 does not include a psychoacoustic audio encoding device, the soundfield representation generator 24 may then transmit or otherwise output the ATF audio data to a psychoacoustic audio encoding device (not shown). The psychoacoustic audio encoding device may perform psychoacoustic audio encoding with respect to the ATF audio data to generate a bitstream 27. The source device 12 may then transmit the bitstream 27 via a transmission channel to the content consumer device 14.

In some examples, the psychoacoustic audio encoding device may represent one or more instances of a psychoacoustic audio coder, each of which is used to encode a transport channel of the ATF audio data. In some instances, this psychoacoustic audio encoding device may represent one or more instances of an encoding unit (as noted above). The psychoacoustic audio coder unit may, in some instances, invoke an instance of an encoding unit for each transport channel of the ATF audio data.

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 and the soundfield representation generator 24, the content capture device 20 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding.

In some examples, the content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or third order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14 may be operated by an individual, and may represent a VR client device. Although described with respect to a VR client device, the content consumer device 14 may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14. As shown in the example of FIG. 1A, the content consumer device 14 includes an audio playback system 16A, which may refer to any form of audio playback system capable of rendering the audio data for playback as multi-channel audio content.

While shown in FIG. 1A as being directly transmitted to the content consumer device 14, the source device 12 may output the bitstream 27 to an intermediate device positioned between the source device 12 and the content consumer device 14. The intermediate device may store the bitstream 27 for later delivery to the content consumer device 14, which may request the bitstream 27. The intermediate device may comprise a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14, requesting the bitstream 27.

Alternatively, the source device 12 may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16A. The audio playback system 16A may represent any system capable of playing back multi-channel audio data. The audio playback system 16A may include a number of different renderers 32. The renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause a transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data 19 from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations thereof of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translation movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1C is a block diagram illustrating another example system 60. The example system 60 is similar to the example system 10 of FIG. 1A, however source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
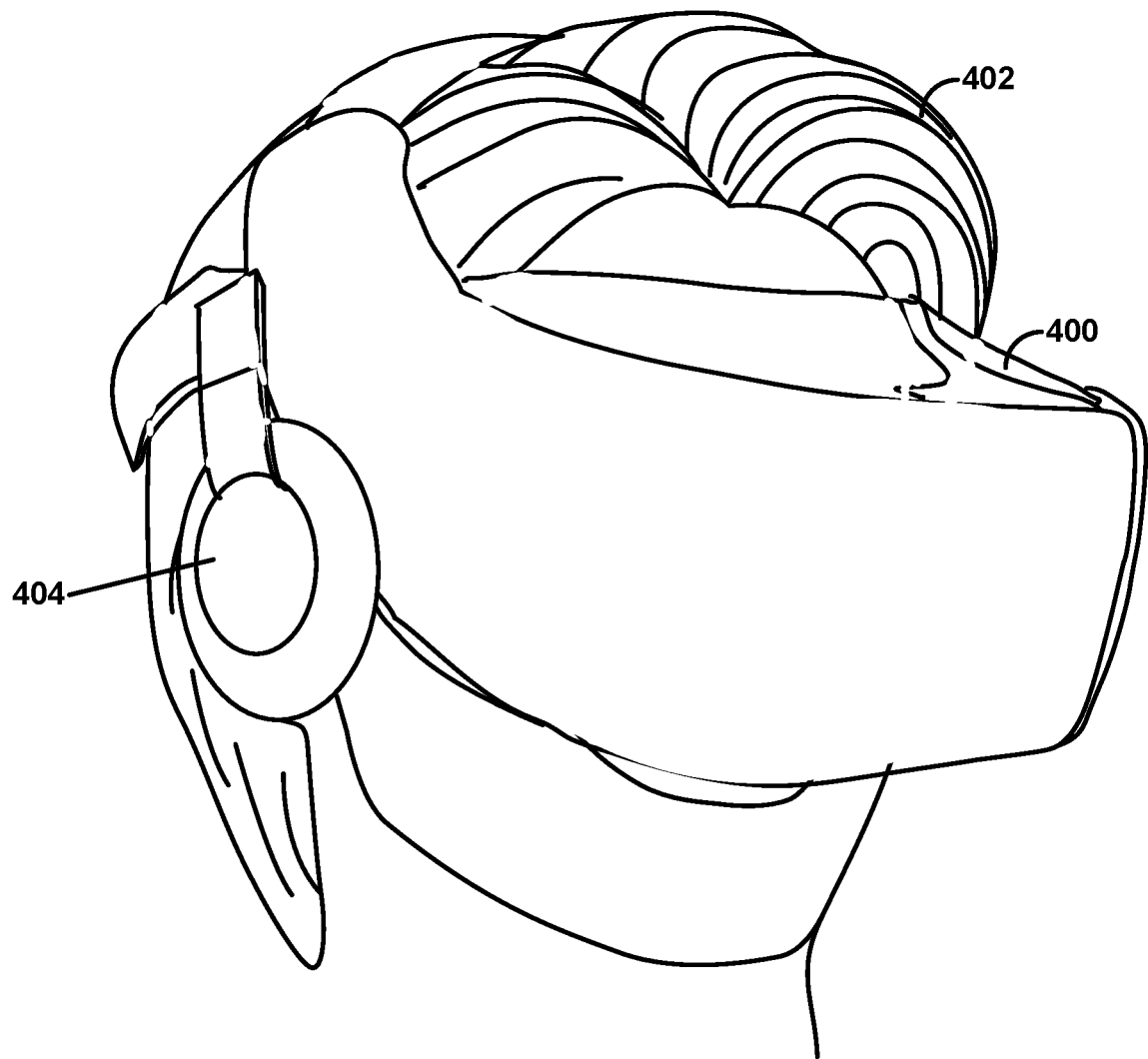
FIG. 2 is a diagram illustrating an example of a VR device worn by a user.

As described above, the content consumer device 14A or 14B (either of which may hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 400 worn by a user 402. The VR device 400 may be used to implement the techniques of this disclosure. The VR device 400 is coupled to, or otherwise includes, headphones 404, which may reproduce a soundfield represented by the audio data 19' through playback of the speaker feeds 35. The speaker feeds 35 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may include a tracking device (e.g., the tracking device 40) that is configured to track head movement of the user 402, and adapt the video data shown via the VR headset 400 to account for the head movements, providing an immersive experience in which the user 402 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 402 to reside in the virtual world visually, often the VR headset 400 may lack the capability to place the user in the displayed world audibly. In other words, the VR system (which may include a computer responsible for rendering the video data and audio data—that is not shown in the example of FIG. 2 for ease of illustration purposes, and the VR headset 400) may be unable to support full three-dimension immersion audibly (and in some instances realistically in a manner that reflects the displayed scene presented to the user via the VR headset 400).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 402 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which, for simplicity purposes, is hereinafter referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Figure 3:
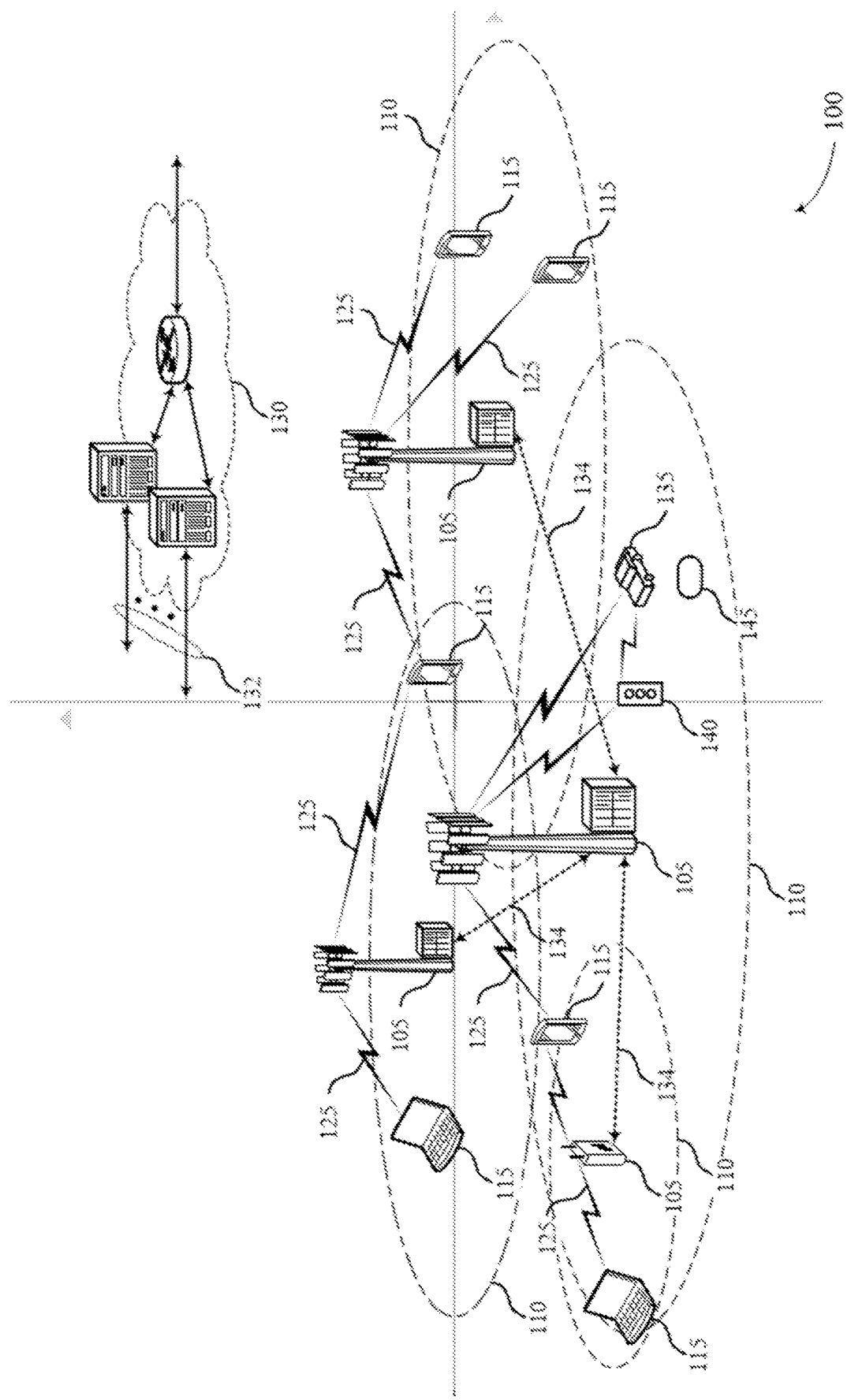
FIG. 3 illustrates an example of a wireless communications system 100 that supports devices and methods in accordance with aspects of the present disclosure.

FIG. 3 illustrates an example of a wireless communications system 100 that supports the devices and methods in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, $5^{th}$ generation (5G) cellular network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro, $5^{th}$ generation cellular or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. A captured audio stream and a synthesized audio stream may contain one or more audio sources. In some examples, a synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio information, such as metadata, indicating privacy restrictions and/or password-based privacy data to toggle, mask, and/or null various audio streams and/or audio sources as will be described in more detail below.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

A content creator or a user 402 of a headset, such as VR headset 400 of FIG. 2, may not care equally about all audio objects. For example, some audio sources may be inactive, distant or merely background noise and the content creator or user 402 may not believe those objects are important to a scene. The content consumer device 14 may consume computing resources (such as processing cycles, memory bandwidth, memory and/or storage space, etc.) decoding less important audio sources.

In accordance with various aspects of the techniques described in this disclosure, source device 12 or content consumer device 14 may prioritize certain audio sources or objects. The content consumer device 14 may then utilize the prioritization to allocate more resources to decode the more important objects and fewer resources to decode the less important objects. For example, content consumer device 14 may code an important audio object with more ambisonic coefficients than a less important audio object. In this manner, source device 12 or content consumer device 14 may save processing power, bandwidth and battery life by prioritizing audio streams based on associated visual objects.

In operation, the source device 12 and the content consumer device 14 may analyze image data in a scene and audio sources in audio streams and associate image objects in the image data with the audio sources in the audio streams. The source device 12 and the content consumer device 14 may assign a respective priority value to each of the image objects and their respective audio sources and code ambisonic coefficients based on the assigned priority value. For example, the source device 12 or the content consumer device 14 may analyze the scene and assign a higher priority value to active image objects and a lower priority value to inactive image objects. The source device 12 and the content consumer device 14 may also associate audio objects with the higher priority image objects and with the lower priority image objects. The content consumer device 14 may decode the higher priority audio objects using more bits or information or higher order ambisonics than the content consumer device 14 uses to decode the lower priority audio objects. More information regarding various aspects of the prioritization techniques is discussed below with respect to FIGS. 4A and 4B.

Figure 4A:
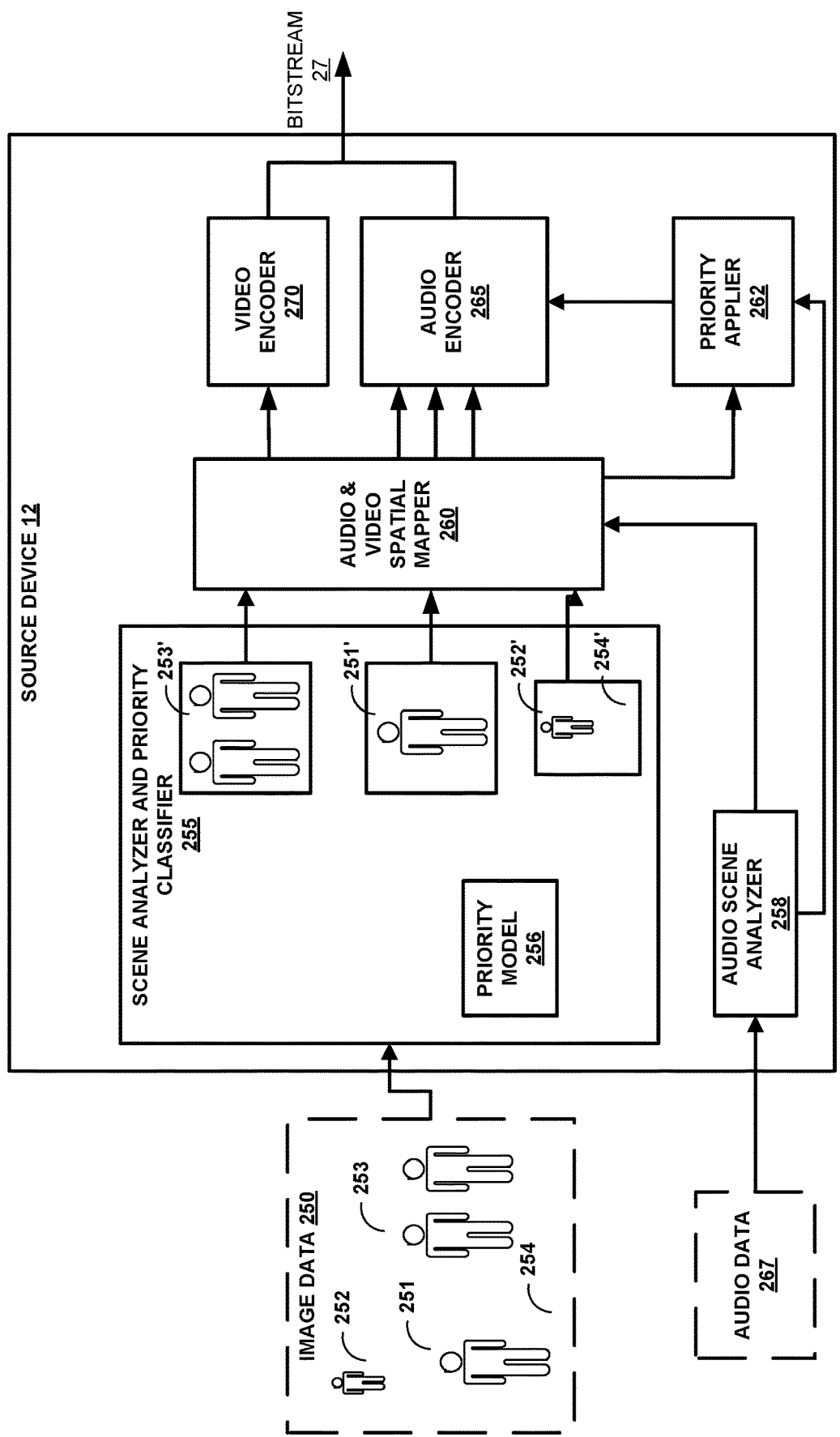
FIGS. 4A-4C are block diagrams of devices illustrating various aspects of techniques described in this disclosure.

FIG. 4A is a block diagram illustrating various aspects of the techniques described in this disclosure. The image data 250 may be captured by the source device 12. For example, the source device 12 may capture the image data 250 through a camera, such camera 600 shown in FIG. 6A or 6B, discussed later. In some examples, the image data may be computer generated. In the example of FIG. 4A, the image contains several image objects: image object 251 of a person standing in the foreground, image object 252 of a person further away from the camera 600, image object 253 of two people having a conversation, and image object 254 of an unoccupied area.

The scene analyzer and priority classifier 255 receives the image data 250 and analyzes it so as to identify image objects contained therein. The scene analyzer and priority classifier 255 may represent hardware or a combination of hardware and software that performs visual scene analysis of video data, such as the image data 250. Visual scene analysis may involve aspects of computer vision, which refers to a process by which a computer or other device may process and analyze images to detect and identify various objects and/or aspects of the image. Computer vision may in some instances be referred to as machine vision, as computer vision and machine vision have many overlapping or related concepts. Often, machine vision employs aspects or concepts of computer vision but in different contexts. Although the disclosure refers to computer vision when describing the techniques, the techniques may also be performed using machine vision either in conjunction with or as an alternative to computer vision. For this reason, the terms "machine vision" and "computer vision" may be used interchangeably.

Although not shown in the example of FIG. 4A, the scene analyzer and priority classifier 255 may, in some instances, communicate with an image server or other database external from the source device 12 when performing visual scene analysis. The scene analyzer and priority classifier 255 may communicate with this image server to offload various aspects of the often resource (meaning, processing resources and/or memory resource) intensive visual scene analysis process. For example, the scene analyzer and priority classifier 255 may perform some initial analysis to detect objects, passing these objects to the image server for identification. The image server may then classify or otherwise identify the object, passing the classification of the classified object back to the scene analyzer and priority classifier 255. The scene analyzer and priority classifier 255 may communicate with the image server via a wireless session. As such, the source device 12 may include one or more interfaces (although not shown in the example of FIG. 4A) by which source device 12 may communicate with peripheral devices, servers, and any other type of device or accessory either wirelessly or via a wired connection. The scene analyzer and priority classifier 255 may output image objects as a result of performing the visual scene analysis.

In some examples, the scene analyzer and priority classifier 255 may utilize machine learning to learn to classify or otherwise identify objects in a scene. For example, the scene analyzer and priority classifier 255 may utilize a machine learning algorithm to learn to classify objects that the scene analyzer and priority classifier 255 passes off to the image server.

According to aspects of the present disclosure, the scene analyzer and priority classifier 255 may assign a respective priority value to the identified objects. In some examples, a priority model 256 may be employed. This priority model 256 may be stored in memory as a table, for instance. The priority model 256 may associate types of image objects with priorities. For example, the priority model may place a higher priority on certain image objects than other objects. The source device 12 may apply the priority values for the identified objects to object information, such as metadata, and/or spatial components, such as V-vectors. While the examples discussed herein refer to V-vectors, a V-vector is just one example of a spatial component and other examples may be used according to the techniques of this disclosure. The content consumer device 14 may use the prioritized object information and/or prioritized V-vectors to render audio objects that are more likely to be important to the content creator in higher quality and render less important audio objects in lower quality. This saves processing power and storage over rendering all the audio objects with a higher quality. The priority model 256 may be predetermined, may be configurable by a content creator, or both.

In some examples, the content creator may configure the priority model 256 to have 5 levels of priority values, 1-5 with 5 being the highest priority. The content creator may assign a priority value of 5 to a person, 1 to a car, 3 to a dog and 1 to a tree, for example.

In other examples, because the image object 253 contains two people talking, one may want to place a higher priority value on that object. The image object 251 contains a person nearby, but who currently is not talking. Because they are nearby, one may want to place a medium priority value on that image object 251. With respect to the image object 252, the person in the distance, and the image object 254, empty space, one may want to place a low priority value on the person in the distance and the empty space, as they may be less likely to be important to the content creator or the user 402 of a VR headset 400. Once the scene analyzer and priority classifier 255 analyzes the scene, it may assign a respective priority value to each analyzed audio object. For example, the scene analyzer and priority classifier 255 may apply the priority model 256 to prioritize the image objects. While in this example of the priority model 256, as described, there are three priority values discussed (low, medium, and high), any number of priority values may be used in the priority model 256. Additionally, the priority model 256 may address things other than people speaking. For instance, it may address animals, motor vehicles, bodies of water and any other image object that could appear in the image data 250.

The source device 12 may also capture audio data through one or more microphones (not shown), such as the microphone 18 of FIGS. 1A, 1B, 6A and 6B. An audio scene analyzer 258 may receive the audio data 267 and may analyze the audio data 267. In some examples, the audio data 267 may be synthesized. Audio data 267 may comprise one or more audio sources represented in one or more audio streams. For example, the audio scene analyzer 258 may analyze the audio scene using known sound source separation methods, such as blind source separation, independent component analysis (ICA), principal component analysis (PCA), singular value decomposition (SDV), etc. to identify the audio objects in the audio data 267. Audio objects may refer to sounds that are distinct or recognizable, which may be classified or otherwise associated with a given object. For example, a motor vehicle engine may emit a sound that is readily recognizable. The audio scene analyzer 258 may attempt to detect and identify or classify, in the audio data 267, these sounds.

Similar to the scene analyzer and priority classifier 255, the audio scene analyzer 258 may, in some instances, communicate with an audio network server or other database external to, and possibly remote from, the source device 12 when performing auditory scene analysis. The audio scene analyzer 258 may communicate with this audio server to offload various aspects of the often resource (meaning, processing resources and/or memory resource) intensive auditory scene analysis process. For example, audio scene analyzer 258 may perform some initial analysis to detect objects, passing these objects to the audio server for identification. The audio server may then classify or otherwise identify the object, passing the classified object back to the audio scene analyzer 258. The audio scene analyzer 258 may communicate with this audio server using the interfaces mentioned above when describing the scene analyzer and priority classifier 255.

In one example, prioritized image objects 251'-254' and audio objects within the audio data 267 may each be defined in accordance with a compatible or common format, meaning that the prioritized image objects 251'-254' and audio objects within the audio data 267 are both defined in a manner that facilitates associations therebetween. Each of the prioritized objects 251'-254' and the objects within the audio data 267 may include audio information, such as metadata, defining one or more of a predicted location (e.g., an x, y, z coordinate) of the corresponding object, a size (or predicted size) of the corresponding object, a shape (or predicted shape) of the corresponding object, a speed (or a predicted speed) of the corresponding object, a location confidence level, and whether the object is in focus, or whether the object belongs to the near foreground, far foreground or the near background or the far background, to provide a few examples.

The audio scene analyzer 258 may determine a theta, phi and/or psi angle for each audio object and may provide the audio objects and the associated theta, phi and/or psi angle to an audio and video spatial mapper 260. In some example, audio scene analyzer may provide the audio objects and/or associated theta, phi and/or psi angle to a priority applier 262.

The audio and video spatial mapper 260 may receive the prioritized image objects 251'-254' and the audio objects and map them into space. For instance, the audio and video spatial mapper 260 may utilize location information associated with the image objects and the theta, phi and/or psi angle for the audio objects to map the objects in space. The audio and video spatial mapper 260 may associate one or more of the prioritized image objects 251'-254' with one or more audio objects in the audio data 267 based on the mappings and/or the object type. For instance, if an image object is identified as a dog and an audio object is identified as a dog barking and they are mapped to generally the same area in space, the audio and video spatial mapper 260 may associate the image object and the audio object.

More information on scene analysis, audio scene analysis and associating image objects with audio objects may be found in U.S. Pat. No. 9,338,420 entitled Video Analysis Assisted Generation of Multi-channel Audio Data.

The audio and video spatial mapper 260 may provide the priority values for the audio objects to a priority applier 262. In some examples, the priority applier 262 may receive the priority values for the audio objects directly from scene analyzer and priority classifier 255.

The priority applier 262 may apply the assigned priority values to audio object information and/or V-vectors to be generated during encoding. For example, the priority applier may assign a priority value of high to the audio object in the audio data 267 associated with the prioritized image object 253', may assign a priority value of medium to the audio object associated with the prioritized image object 251', and may assign a priority to the audio objects associated with the prioritized image objects 252' and 254' (e.g., low).

A video encoder 270 may receive video data from audio & video spatial mapper 260 and encode the video data. An audio encoder 265 may receive audio data from the audio and video spatial mapper 260 and priority values from the priority applier 262. In some examples, audio & video spatial mapper may provide the priority values to audio encoder 265, rather than priority applier 262. In some examples, the audio encoder 265 may encode the audio objects differently based upon their priority values. In some examples, the audio encoder 265 may encode audio information, such as metadata, indicative of a priority value of an audio object. Encoding audio information, such as metadata, indicative of a priority value of an audio object may be beneficial to a content consumer device that does not have the ability to perform scene analysis. Encoding audio information, such as metadata, indicative of a priority value of an audio object may also be beneficial to a content consumer device that does have the ability to perform scene analysis, but has a low battery charge. In such examples, the content consumer device may utilize the information indicating the priority value to determine how to decode each object, such as to decode lower priority audio objects using lower order ambisonics than higher priority audio objects, without performing scene analysis.

The audio encoder 265 may also or alternatively encode the audio data itself differently. For example, the audio encoder 265 may encode higher priority audio objects with higher order ambisonics than lower priority audio objects. The audio encoder 265 may modify the V-vectors based on priority values of audio objects (received from the priority applier 262) included in a scene so that when the audio encoded signal is decoded, the resulting decoded signal has variable signal-to-noise ratio in the foreground. For example, the signal-to-noise ratio for one audio object in the foreground has a different signal-to-noise ration than another audio object in the foreground. The video encoder 270 and audio encoder 265 may output encoded video data and encoded audio data into the bitstream 27.

In some examples, the source device 12 may store the bitstream 27 directly into memory (not shown) and not transmit the bitstream 27. In other examples, the source device 12 may not compress the audio data and video data from the audio and video spatial mapper 260. For example, the audio and video data from the audio and video spatial mapper 260 may be written to one or more buffers (not shown) for playout, such as when the source device 12 may be in a camcorder mode.

Figure 4B:
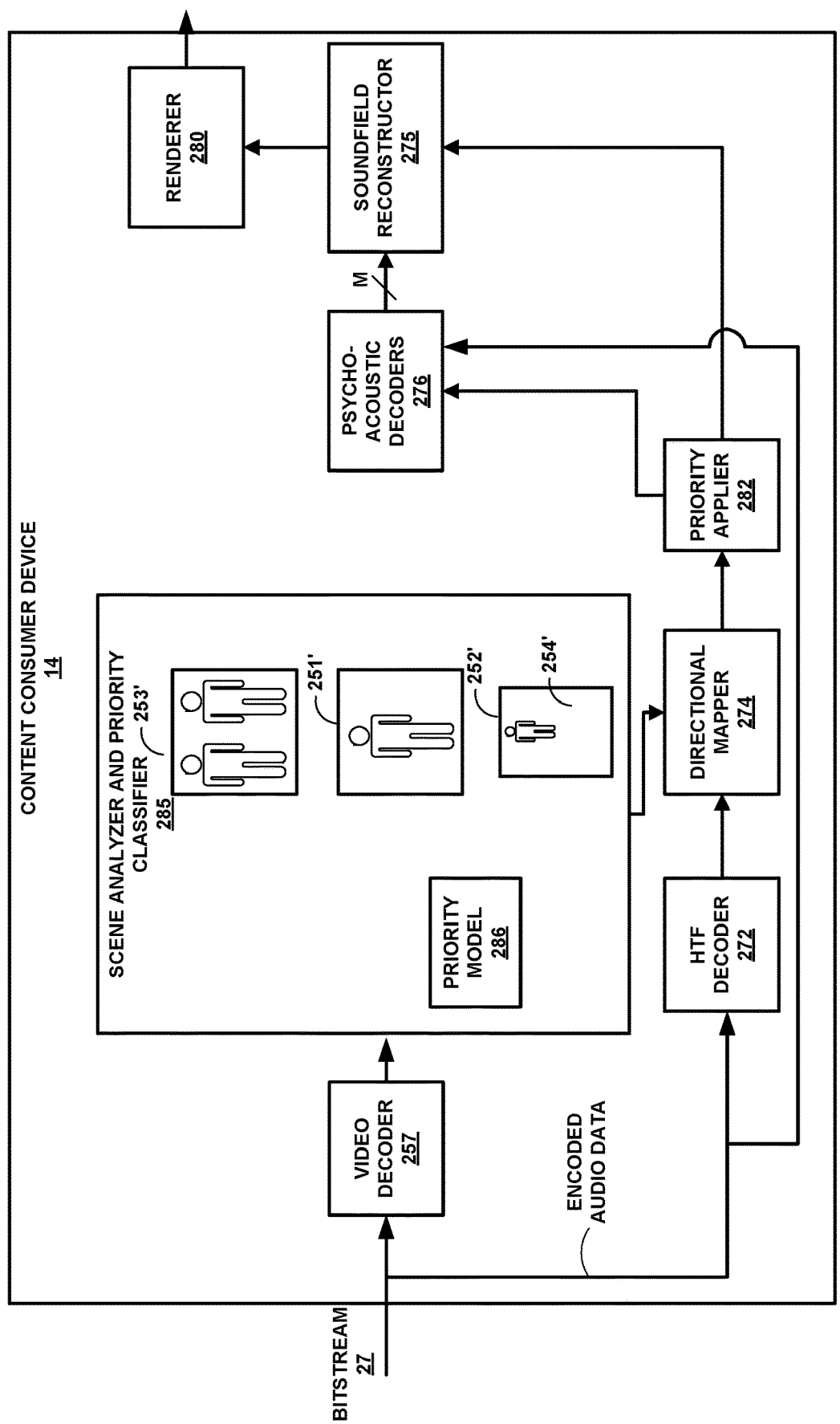

FIG. 4B is a block diagram of a content consumer device illustrating various aspects of the techniques described in this disclosure. The content consumer device 14 may receive the bitstream 27. For example, the bitstream 27 may be received from the source device 12 as shown in FIG. 1A, 1B, 1C, 4A, 6A or 6B. A video decoder 257 may receive the encoded video data from the bitstream 27 and decode the encoded video data to regenerate the image data 250, shown for example in FIG. 4A.

The scene analyzer and priority classifier 285 receives the image data 250 from the video decoder 257. The scene analyzer and priority classifier 285 may analyze the image data 250 to identify image objects contained therein. The scene analyzer and priority classifier 285 may also determine directional information associated with each image object contained therein. The scene analyzer and priority classifier 285 may represent hardware or a combination of hardware and software that performs visual scene analysis of video data, such as the image data 250. Visual scene analysis may involve aspects of computer vision, which refers to a process by which a computer or other device may process and analyze images to detect and identify various objects and/or aspects of the image. Computer vision may in some instances be referred to as machine vision, as computer vision and machine vision have many overlapping or related concepts. For this reason, the terms "machine vision" and "computer vision" may be used interchangeably.

Although not shown in the example of FIG. 4B, the scene analyzer and priority classifier 285 may, in some instances, communicate with an image server or other database external from the content consumer device 14 when performing visual scene analysis. The scene analyzer and priority classifier 285 may communicate with this image server to offload various aspects of the often resource (meaning, processing resources and/or memory resource) intensive visual scene analysis process. For example, the scene analyzer and priority classifier 285 may perform some initial analysis to detect objects, passing these objects to the image server for identification. The image server may then classify or otherwise identify the object, passing the classified object back to the scene analyzer and priority classifier 285. The scene analyzer and priority classifier 285 may communicate with the image server via a wireless session. As such, the content consumer device 14 may include one or more interfaces (although not shown in the example of FIG. 4B) by which content consumer device 14 may communicate with peripheral devices, servers, and any other type of device or accessory either wirelessly or via a wired connection. The scene analyzer and priority classifier 285 may output image objects as a result of performing the visual scene analysis.

In some examples, the scene analyzer and priority classifier 285 may utilize machine learning to learn to classify or otherwise identify objects in a scene. For example, the scene analyzer and priority classifier 285 may utilize a machine learning algorithm to learn to classify objects it passes off to the image server.

According to aspects of the present disclosure, the scene analyzer and priority classifier 285 may assign a respective priority value to each image object the scene analyzer and priority classifier 285 identifies. In some examples, a priority model 286 is employed. This priority model 286 may be stored in memory as a table, for instance. The priority model 286 may associate types of image objects with priority values. For example, the priority model may place a higher priority value on certain image objects than other objects. A priority applier 282 and a soundfield reconstructor 275 may use the assigned priority values to render audio objects that are more likely to be important to the user 402 or to the content creator in higher quality and render less important audio objects in lower quality. This saves processing power and storage over rendering all the audio objects with a higher quality. The priority model 286 may be predetermined, may be configurable by a user of content consumer device 14, such as user 402, or both.

In some examples, user 402 may configure the priority model 286 to have 5 levels of priority values, 1-5 with 5 being the highest priority value. The user 402 may assign a priority value of 5 to a person, 1 to a car, 3 to a dog and 1 to a tree.

In other examples, as shown in FIG. 4A, because the image object 253 contains two people talking, one may want to place a higher priority value on that object. The image object 251 contains a person nearby, but who currently is not talking. Because they are nearby, one may want to place a medium priority value on that image object. With respect to the image object 252, the person in the distance, and the image object 254, empty space, one may want to place a low priority value on the person in the distance and the empty space, as they may be less likely to be important to the user 402 of a VR headset 400. Once the scene analyzer and priority classifier 285 analyzes the scene, it may apply the priority model 286 to prioritize the image objects. While in this example of the priority model 286 there are three priority values discussed (low, medium, and high), any number of priority values may be used in the priority model 286. Additionally, the priority model 286 may address things other than people speaking. For instance, it may address animals, motor vehicles, bodies of water and any other thing that could appear in the image data 250.

In some examples, an HTF decoder 272 may receive the encoded audio data from the bitstream 27. The encoded audio data may be representative of one or more audio sources in one or more audio streams. The HTF decoder 272 may decode the encoded audio data and provide decoded audio data, such as V-vectors, to a directional mapper 274. The directional mapper 274 may also receive prioritized image object information including directional information and priority values associated with the prioritized image objects 251'-254'. The directional mapper 274 may search which foreground sounds (sounds appearing to come from in front of user 402, rather than behind) correspond to the prioritized image objects 251'-254'. The directional mapper 274 may attempt to associate audio objects to the prioritized image objects and prioritize the audio objects similarly. In some examples, audio objects in the background (sounds appearing to come from behind user 402) may be assigned a predetermined priority. In some examples, the predetermined priority may be a lowest priority. In some examples, the audio objects in the background may not be decoded. As discussed above, audio objects may refer to sounds that are distinct or recognizable, which may be classified or otherwise associated with a given object. For example, a motor vehicle engine may emit a sound that is readily recognizable. The directional mapper 274 may attempt to detect and identify or classify, in the audio data 267, these sounds.

Similar to the scene analyzer and priority classifier 285, the directional mapper 274 may, in some instances, communicate with an audio network server or other database external to, and possibly remote from, the content consumer device 14 when performing auditory scene analysis. The directional mapper 274 may communicate with this audio server to offload various aspects of the often resource (meaning, processing resources and/or memory resource) intensive auditory scene analysis process. For example, directional mapper 274 may perform some initial analysis to detect objects, passing these objects to the audio server for identification. The audio server may then classify or otherwise identify the object, passing the classified object back to audio mapper. The directional mapper 274 may communicate with this audio server using the interfaces mentioned above when describing the scene analyzer and priority classifier 285.

In one example, prioritized image objects 251'-254' and audio objects within the audio data 267 may each be defined in accordance with a compatible or common format, meaning that the prioritized image objects 251'-254' and audio objects within the audio data 267 are both defined in a manner that facilitates associations therebetween. Each of the prioritized objects 251'-254' and the objects within the audio data 267 may include information, such as metadata, defining one or more of a predicted location (e.g., an x, y, z coordinate) of the corresponding object, a size (or predicted size) of the corresponding object, a shape (or predicted shape) of the corresponding object, a speed (or a predicted speed) of the corresponding object, a location confidence level, and whether the object is in focus, or whether the object belongs to the near foreground, far foreground or the near background or the far background, to provide a few examples. The directional mapper 274 may associate one or more of the prioritized image objects 251'-254' with one or more audio objects in the audio data 267 based on the information, such as metadata.

For example, the directional mapper 274 may examine the V-vectors associated with the foreground and attempt to match the audio objects with information in the V-Vectors and assign them a similar priority. The directional mapper 274 may provide the mapped image objects, V-vectors and priority values to a priority applier 282. The directional mapper represents hardware or a combination of hardware and software may attempt to associate the prioritized image objects 251'-254' with audio objects within the audio data 267. The priority applier 282 may weight V-vectors of the audio objects based on their priority values or the priority values of their associated image objects.

The priority applier 282 may provide the priority values of the audio objects associated with the prioritized image objects (e.g., 251'-254') to psychoacoustic decoders 276. Psychoacoustic decoders 276 may receive the encoded audio signal and may utilize the priority values to determine which quality to decode each representation of an audio source, such as a U signal. While U signals are discussed in the examples herein, other representations of audio sources may be used according to the techniques of this disclosure. As used herein, representation of an audio source or representations of audio sources may also be called an audio source or audio sources, respectively. For example, an audio object with a higher priority value may be decoded by psychoacoustic decoders 276 with a higher quality than an audio object with a lower priority value.

In some examples, such as the example discussed above where the user 402 configured the priority model 286 to have five levels of priority, the psychoacoustic decoders 276 may base their decoding upon both the priority level of a given object and a resource availability, such as battery power, or network link strength, such as personal area network link strength. For example: If the battery power level is less than 50% but more than 20%, the psychoacoustic decoders 276 may only decode objects whose priority is 3 or greater; if the battery power level is 100%, the psychoacoustic decoders 276 may decode all the objects; and if the battery power level is less than or equal to 20%, the psychoacoustic decoders 276 may decode only objects whose priority is 5.

The priority applier 282 may also modify the V-vectors based on priority of audio objects included in a scene so that the resulting decoded signal has variable signal-to-noise ratio in the foreground (e.g., different audio objects have different signal-to-noise ratios) and sends the modified V-vectors to the soundfield reconstructor 275.

The psychoacoustic decoders 276 may provide a number M of decoded U signals to a soundfield reconstructor 275. The soundfield reconstructor 275 may receive weighted V-vectors from the priority applier 262. The soundfield reconstructor 275 may then reconstruct the soundfield based on the U signals and V-vectors output the soundfield to a renderer 280 for rendering for the user 402.

In some examples, the content consumer device 14 may store the bitstream 27 directly into memory (not shown). In other examples, the content consumer device 14 may receive an uncompressed bitstream and not decode the video and audio data.

Figure 4C:
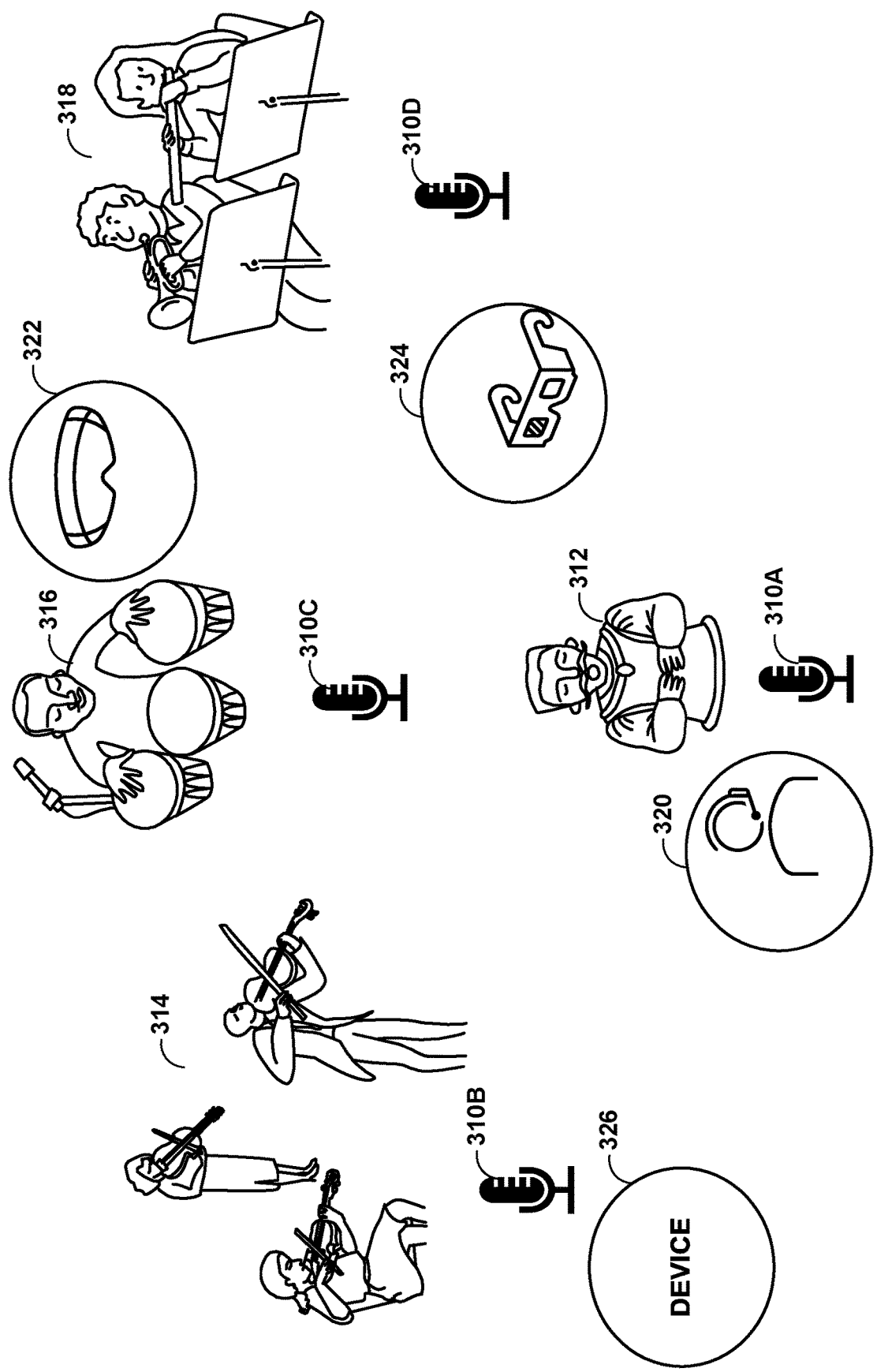

FIG. 4C is a conceptual diagram illustrating an example concert with three or more audio receivers. In the example of FIG. 4C, a number of musicians are depicted on stage 323. Singer 312 is positioned behind microphone 310A. A string section 314 is depicted behind microphone 310B. Drummer 316 is depicted behind microphone 310C. Other musicians 318 are depicted behind microphone 310D. Microphones 310A-301D may capture audio streams that correspond to the sounds received by the microphones. In some examples, microphones 310A-310D may represent synthesized audio streams. For example, microphone 310A may capture an audio stream(s) primarily associated with singer 312, but the audio stream(s) may also include sounds produced by other band members, such as the string section 314, the drummer 316 or the other musicians 318, while the microphone 310B may capture an audio stream(s) primarily associated with string section 314, but include sounds produced by other band members. In this manner, each of microphones 310A-310D, may capture a different audio stream(s).

Also depicted are a number of devices. These devices represent user devices located at a number of different listening positions. Headphones 320 are positioned near microphone 310A, but between microphone 310A and microphone 310B. As such, content consumer device 14 may select at least one of the audio streams to produce an audio experience for the user of the headphones 320 similar to the user being located where the headphones 320 are located in FIG. 4C. Similarly, VR goggles 322 are shown located behind the microphone 310C and between the drummer 316 and the other musicians 318. The content consumer device 14 may select at least one audio stream to produce an audio experience for the user of the VR goggles 322 similar to the user being located where the VR goggles 322 are located in FIG. 4C.

Smart glasses 324 are shown located fairly centrally between the microphones 310A, 310C and 310D. The content consumer device 14 may select at least one audio stream to produce an audio experience for the user of the smart glasses 324 similar to the user being located where the smart glasses 324 are located in FIG. 4C. Additionally, device 326 (which may represent any device capable of implementing the techniques of this disclosure, such as a mobile handset, a speaker array, headphones, VR goggles, smart glasses, etc.) is shown located in front of microphone 310B. The content consumer device 14 select at least one audio stream to produce an audio experience for the user of the device 326 similar to the user being located where the device 325 is located in FIG. 4C. While specific devices where discussed with respect to particular locations, a used of any of the devices depicted may provide an indication of a desired listening position that is different than depicted in FIG. 4C. Any of the devices of FIG. 4C may be used to implement the techniques of this disclosure.

Figure 5:
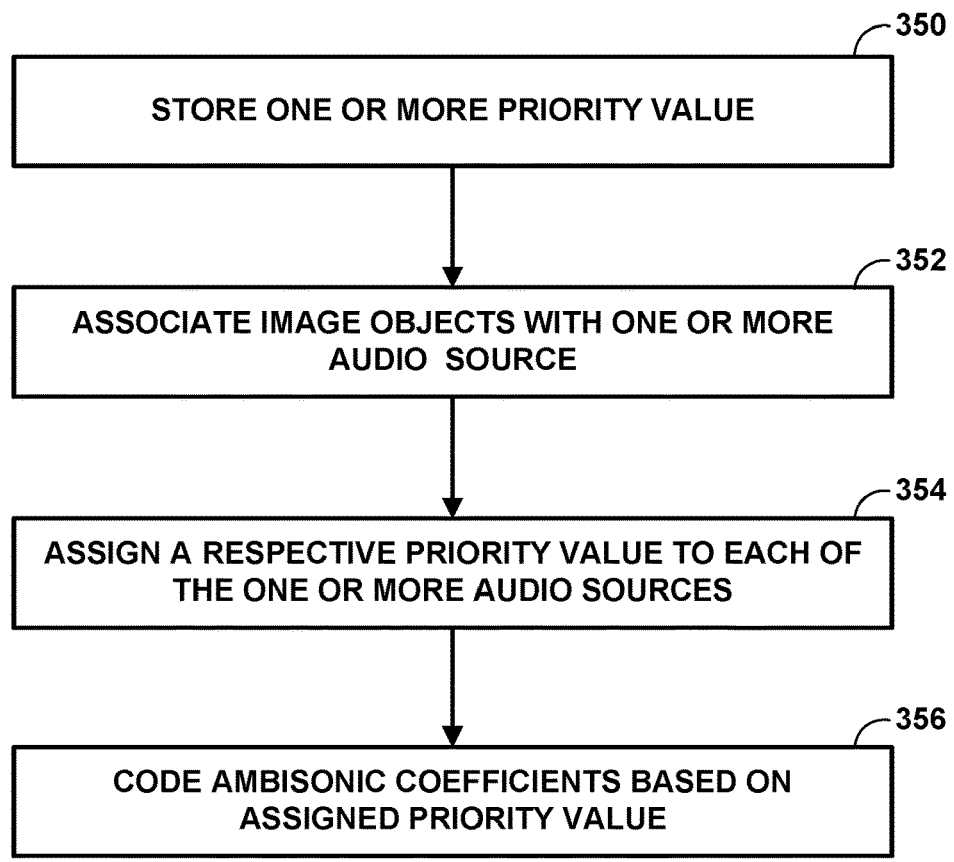
FIG. 5 is a flowchart illustrating example prioritization techniques of this disclosure.

FIG. 5 is a flowchart illustrating example prioritization techniques of this disclosure. Source device 12 or content consumer device 14 may store one or more priority values in memory (350). Each of the one or more priority values are associated with a type of image object associated with image data. For example, one priority value may be associated with two people talking (e.g., image object 253) and another priority value may be associated with a person in the distance (e.g., image object 252).

One or more processors of source device 12 or content consumer device 14 associate image objects in the image data with one or more audio sources represented in one or more audio streams (352). For example, source device 12 or content consumer device 14 may associate an audio stream of an engine sound with an automobile or an audio stream of barking with a dog. In some example, source device 12 or content consumer device 14 may also store location information, such as a theta angle and a phi angle, for each audio source.

In some examples, source device 12 or content consumer device 14 may spatially map the one or more audio sources represented in the one or more audio streams to the image objects when associating the image objects in the image data with the one or more audio sources represented in the one or more audio streams. In some examples, source device 12 or content consumer device 14 may match spatially mapped audio sources with V-vectors. In some examples, source device 12 or content consumer device 14 may only match spatially mapped audio sources with V-vectors in a foreground (e.g., V-vectors not behind the user). In some examples, source device 12 or content consumer device 14 may modify the V-vectors to differentiate a signal-to-noise ratio for at least two of the one or more audio sources when the at least two of the one or more audio streams are coded.

One or more processors of source device 12 or content consumer device 14 assign a respective priority value to each of the one or more audio sources represented in the one or more audio streams (354). For example, source device 12 or content consumer device 14 may determine the priority associated with an image object and assign the same priority to an audio source associated with the image object. For example, if an image object of a dog has a high priority, the audio source of the dog barking may also be assigned a high priority. Source device 12 or content consumer device 14 may code (e.g., encode or decode, respectively) ambisonic coefficients based on the assigned priority value (356). For example, for an audio source having a higher assigned priority, source device 12 or content consumer device 14 may code (e.g., encode or decode, respectively) that audio source using more ambisonic coefficients than an audio source with a lower assigned priority. In some examples, source device 12 or content consumer device 14 may code more bits for higher priority value audio sources than for lower priority value audio sources. In some examples, source device 12 or content consumer device 14 may modify the V-vectors to differentiate a signal-to-noise ratio for at least two of the one or more audio sources when the at least two of the one or more audio streams are coded. In some examples, the coding is based upon the assigned priority value and an available resource. For example, source device 12 or content consumer device 14 may determine that a battery power level is low and may code the ambisonic coefficients differently than source device 12 or content consumer device 14 would have if the battery power level was higher. In some examples, content consumer device 14 may combine at least two of the one or more audio source by at least one of mixing or interpolation.

Figure 6:
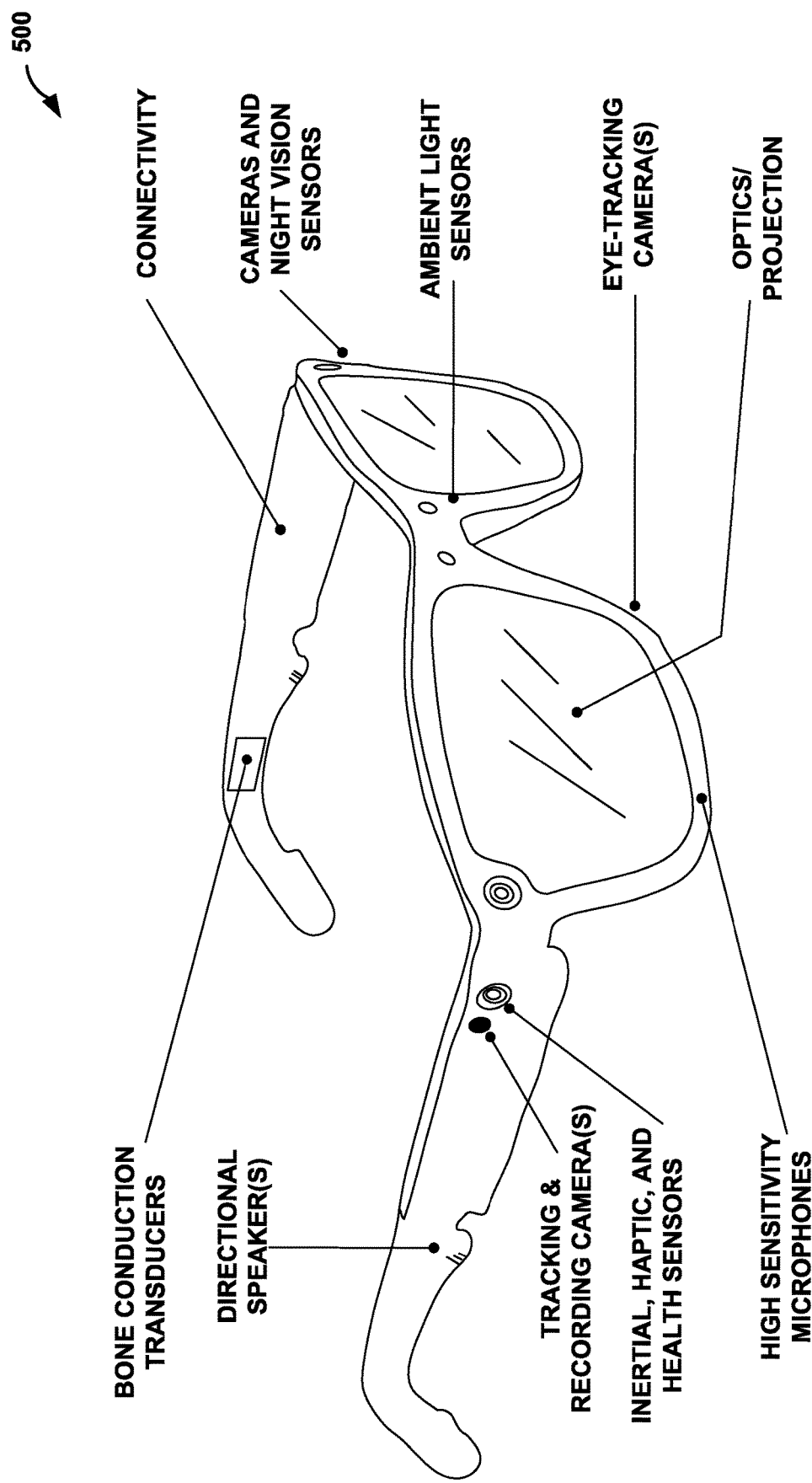
FIG. 6 is a diagram illustrating an example of a wearable device that may operate in accordance with various aspect of the techniques described in this disclosure.

FIG. 6 is a diagram illustrating an example of a wearable device 500 that may operate in accordance with various aspect of the techniques described in this disclosure. In various examples, the wearable device 500 may represent a VR headset (such as the VR headset 400 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D objects and part photographed real objects are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 1100, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as Long Term Evolution (LTE), LTE-Advanced (LTE-A), LTE-A Pro, 5G cellular, a New Radio (NR), Bluetooth, etc. The wearable device 500 also includes one or more ambient light sensors, and bone conduction transducers. In some instances, the wearable device 500 may also include one or more passive and/or active cameras with fisheye lenses and/or telephoto lenses. Although not shown in FIG. 6, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 6, wearable device 500 may include other types of sensors for detecting translational distance.

Although described with respect to particular examples of wearable devices, such as the VR device 1100 discussed above with respect to the example of FIG. 6 and other devices set forth in the examples of FIGS. 1A-1C, a person of ordinary skill in the art would appreciate that descriptions related to FIGS. 1A-1C, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 7A:
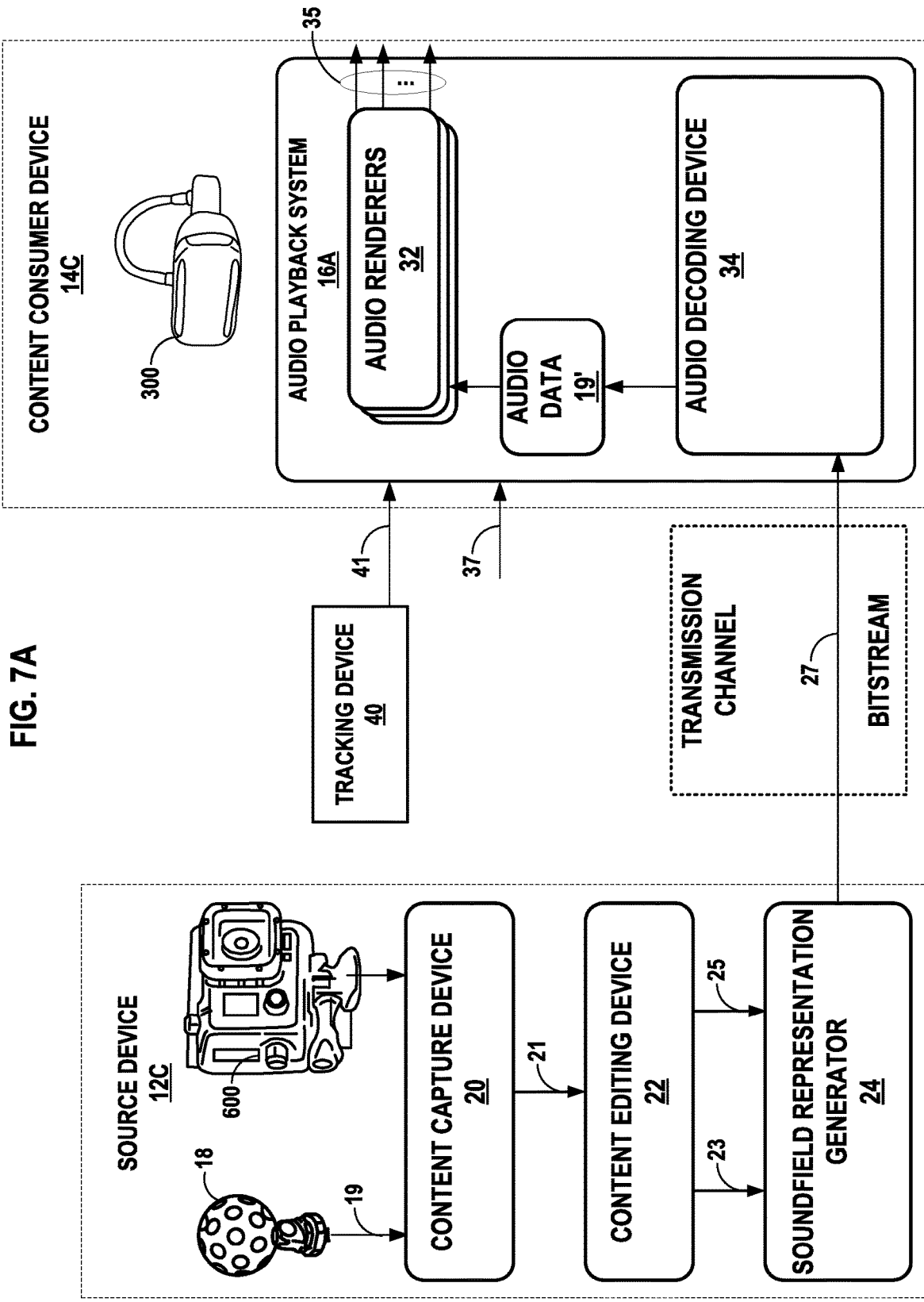
FIGS. 7A and 7B are diagrams illustrating other example systems that may perform various aspects of the techniques described in this disclosure.
Figure 7B:
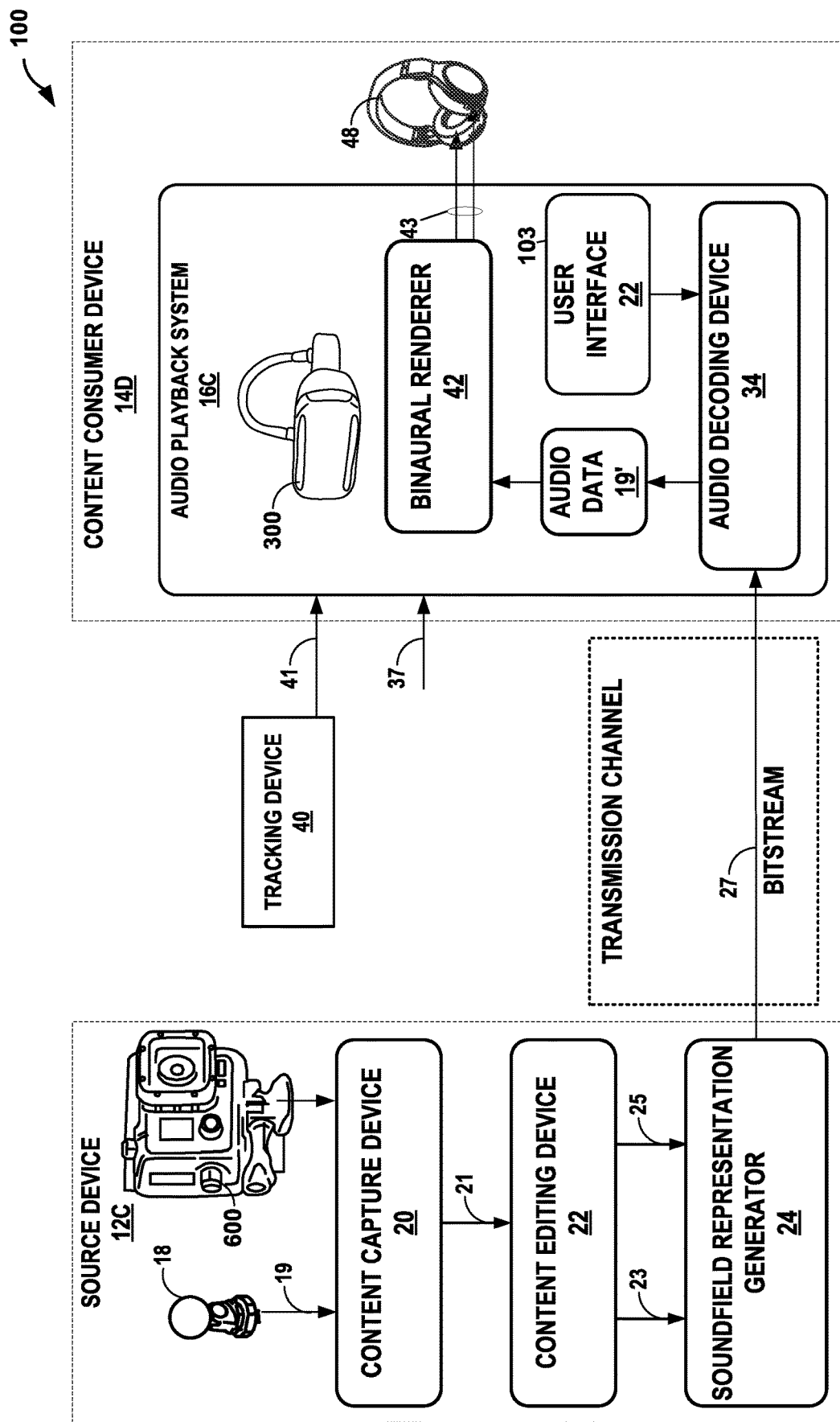

FIGS. 7A and 7B are diagrams illustrating example systems that may perform various aspects of the techniques described in this disclosure. FIG. 7A illustrates an example in which the source device 12 further includes a camera 600. The camera 600 may be configured to capture video data, and provide the captured raw video data to the content capture device 20. The content capture device 20 may provide the video data to another component of the source device 12, for further processing into viewport-divided portions.

In the example of FIG. 7A, the content consumer device 14 also includes the wearable device 300. It will be understood that, in various implementations, the wearable device 300 may be included in, or externally coupled to, the content consumer device 14. The wearable device 300 includes display hardware and speaker hardware for outputting video data (e.g., as associated with various viewports) and for rendering audio data.

FIG. 7B illustrates an example in which the audio renderers 32 shown in FIG. 7A are replaced with a binaural renderer 42 capable of performing binaural rendering using one or more HRTFs or the other functions capable of rendering to left and right speaker feeds 43. The audio playback system 16C may output the left and right speaker feeds 43 to headphones 44.

The headphones 44 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 44 may recreate, based on the left and right speaker feeds 43, the soundfield represented by the audio data 19'. The headphones 44 may include a left headphone speaker and a right headphone speaker which are powered (or, in other words, driven) by the corresponding left and right speaker feeds 43.

Figure 8:
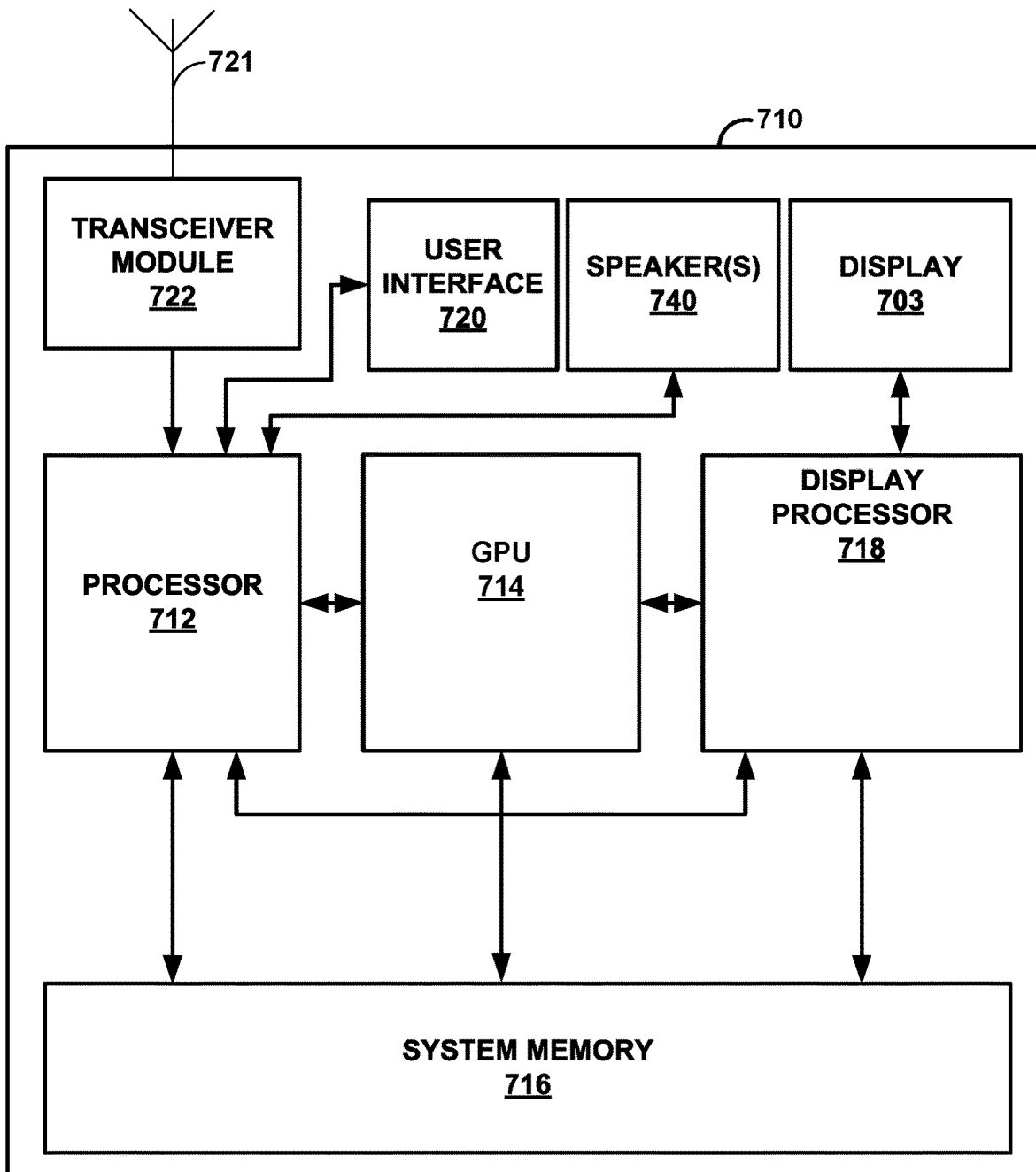
FIG. 8 is a block diagram illustrating example components of one or more of the source devices and the content consumer device shown in the example of FIG. 1A-1C.

FIG. 8 is a block diagram illustrating example components of one or more of the source device and the content consumer device shown in the example of FIG. 1A, FIG. 1B, or FIG. 1C. In the example of FIG. 8, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (i.e., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (i.e., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may comprise one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the content consumer device 14 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

This disclosure includes the following examples.

Clause 1. A device configured to obtain image data, the device comprising: a memory configured to store one or more priority values each one or more priority values associated with a type of image object associated with the image data; and one or more processors coupled to the memory, and configured to: associate image objects in the image data with one or more audio sources in one or more audio streams; assign a respective priority value to each of the one or more audio sources in the one or more streams; and code ambisonic coefficients based on the assigned priority value.

Clause 2. The device of clause 1, wherein the one or more processors are further configured to spatially map the one or more audio sources in the one or more audio streams to the associated image objects.

Clause 3. The device of clause 2, wherein the location information comprises a theta angle and a phi angle for each audio source.

Clause 4. The device of any combination of clauses 2-3, wherein the location information further comprises a V-vector for each audio source and one or more processors are further configured to match the spatially mapped audio sources with the V-vectors.

Clause 5. The device of clause 4, wherein the one or more processors are further configured to match the spatially mapped audio sources with the V-vectors only in a foreground.

Clause 6. The device of any combination of clauses 4-5, wherein the one or more processors are further configured to modify the V-vectors to differentiate a signal to noise ratio for at least two of the one or more audio source when the at least two of the one or more audio sources are coded.

Clause 7. The device of any combination of clauses 1-6, wherein the one or more processors are further configured to code more bits for higher priority value audio sources than for lower priority value audio sources.

Clause 7.1 The device of any combination of clauses 1-7, wherein the one or more processors are further configured to code a number of ambisonic coefficients based on the assigned priority value and an available resource.

Clause 7.2 The device of clause 7.1, wherein the available resource is a battery power level.

Clause 8. The device of any combination of clauses 1-7.2, wherein the one or more processors are further configured to output the one or more audio sources to one or more speakers.

Clause 9. The device of any combination of clauses 1-8, wherein the one or more processors are further configured to combine at least two of the one or more audio sources.

Clause 10. The device of clause 9, wherein the one or more processors combine the at least two of the one or more audio sources by at least one of mixing or interpolation.

Clause 11. The device of any combination of clauses 1-10, further comprising a display device.

Clause 12. The device of any combination of clauses 1-11, further comprising a microphone, wherein the one or more processors are further configured to receive a voice command embedded in an audio stream from the microphone and control the display device based on the voice command.

Clause 13. The device of any combination of clauses 1-12, further comprising one or more speakers.

Clause 14. The device of any combination of clauses 1-12, wherein the device comprises a mobile handset.

Clause 15. The device of any combination of clauses 1-13, wherein the device comprises an extended reality headset, and wherein an acoustical space comprises a scene represented by video data captured by a camera.

Clause 16. The device of any combination of clauses 1-13, wherein the device comprises an extended reality headset, and wherein an acoustical space comprises a virtual world.

Clause 17. The device of any combination of clauses 1-16, further comprising a head-mounted device configured to present an acoustical space.

Clause 18. The device of any combination of clauses 1-17, further comprising a wireless transceiver, the wireless transceiver being coupled to the one or more processors and being configured to receive a wireless signal.

Clause 19. The device of clause 18, wherein the wireless signal conforms to a personal area network standard.

Clause 19.5 The device of clause 19, wherein the personal area network standard comprises an AptX standard.

Clause 20. The device of clause 18, wherein the wireless signal conforms to fifth generation (5G) cellular protocol.

Clause 20.1 The device of any of clauses 1-20, wherein the one or more processors are configured to analyze the image data through computer vision.

Clause 20.2 The device of any of clauses 1-20.1, wherein the one or more processors are configured to analyze the image data through machine learning.

Clause 20.3 The device of any of clauses 1-20.2, wherein the device comprises a decoder.

Clause 20.4 The device of any of clauses 1-20.3, wherein the device comprises an encoder.

Clause 21. A method of obtaining image data comprising: storing, by a memory, one or more priority values each one or more priority values associated with a type of image object associated with the image data; associating, by one or more processors, image objects in the image data with the one or more audio sources in one or more audio streams; assigning, by the one or more processors, a respective priority value to each of the one or more audio sources in the one or more audio streams; and coding, by the one or more processors, ambisonic coefficients based on the assigned priority value.

Clause 22. The method of clause 21, further comprising spatially mapping the one or more audio sources in the one or more audio streams to the associated image objects.

Clause 23. The method of clause 22, wherein the location information comprises a theta angle and a phi angle for each audio source.

Clause 24. The method of any combination of clauses 22-23, wherein the location information further comprises a V-vector for each audio source and the method further comprises matching the spatially mapped audio sources with the V-vectors.

Clause 25. The method of clause 24, further comprising matching the spatially mapped audio sources with the V-vectors only in a foreground.

Clause 26. The method of any combination of clauses 24-25, further comprising modifying the V-vectors to differentiate a signal to noise ratio for at least two of the one or more audio sources when the at least two of the one or more audio streams are coded.

Clause 27. The method of any combination of clauses 21-26, wherein the coding codes more bits for higher priority value audio sources than for lower priority value audio sources.

Clause 27.1 The method of any combination of clauses 21-27, wherein the coding is based upon the assigned priority value and an available resource.

Clause 27.2 The method of clause 27.1, wherein the available resource is a battery power level.

Clause 28. The method of any combination of clauses 21-27.2, further comprising outputting, by the one or more processors, the one or more audio sources to one or more speakers.

Clause 29. The method of any combination of clauses 21-28, further comprising combining, by the one or more processors, at least two of the one or more audio sources.

Clause 30. The method of clause 29, wherein the combining the at least two of the one or more audio sources is by at least one of mixing or interpolation.

Clause 31. The method of any combinations of clauses 21-30, further comprising receiving a voice command embedded in an audio stream from a microphone and controlling, by the one or more processors, a display device based on the voice command.

Clause 32. The method of any combination of clauses 21-31, wherein an acoustical space comprises a scene represented by video data captured by a camera.

Clause 33. The method of any combination of clauses 21-32, wherein an acoustical space comprises a virtual world.

Clause 34. The method of any combination of clauses 21-33, further comprising presenting an acoustical space upon a head-mounted device.

Clause 35. The method of any combination of clauses 21-34, wherein the method is performed on a mobile handset.

Clause 36. The method of any combination of clauses 21-35, further comprising receiving a wireless signal.

Clause 37. The method of clause 36, wherein the wireless signal conforms to a personal area network standard.

Clause 37.5 The device of clause 37, wherein the personal area network standard comprises an AptX standard.

Clause 38. The method of clause 36, wherein the wireless signal conforms to fifth generation (5G) cellular protocol.

Clause 38.1 The method of any combination of clauses 21-38, wherein the analyzing the image data comprises utilizing computer vision.

Clause 38.2 The method of any combination of clauses 21-38.1, wherein the analyzing the image data comprises utilizing machine learning.

Clause 38.3 The method of any combination of clauses 21-38.2, wherein coding is decoding.

Clause 38.4. The method of any combination of clauses 21-38.2, wherein coding is encoding.

Clause 39. A device configured to obtain image data, the device comprising: means for storing one or more priority values each one or more priority values associated with a type of image object associated with the image data; means for associating image objects in the image data with the one or more audio sources in one or more audio streams; means for assigning a respective priority value to each of the one or more audio sources in the one or more audio streams; and means for coding ambisonic coefficients based on the assigned priority value.

Clause 40. The device of clause 39, further comprising means for spatially mapping the one or more audio sources in the one or more audio streams to the image objects.

Clause 41. The device of clause 40, wherein the location information comprises a theta angle and a phi angle for each audio source.

Clause 42. The device of any combination of clauses 40-41, wherein the location information further comprises a V-vector for each audio source and the device further comprises means for matching spatially mapped audio sources with the V-vectors.

Clause 43. The device of clause 42, wherein the means for matching the spatially mapped audio sources with the V-vectors only matches in a foreground.

Clause 44. The device of any combination of clauses 42-43, further comprising means for modifying the V-vectors to differentiate a signal to noise ratio for at least two of the one or more audio sources when the at least two of the one or more audio sources are coded.

Clause 45. The device of any combination of clauses 39-44, wherein the means for coding ambisonic coefficients codes more bits for higher priority value audio sources than for lower priority value audio sources.

Clause 45.1 The device of any combination of clauses 39-45, wherein the means for coding ambisonic coefficients codes ambisonic coefficients based on the assigned priority value and an available resource.

Clause 45.2 The device of any combination of clauses 39-45.1, wherein the available resource is a battery power level.

Clause 46. The device of any combination of clauses 39-45, further comprising means for outputting the one or more audio sources to one or more speakers.

Clause 47. The device of any combination of clauses 39-46, further comprising means for combining at least two of the one or more audio sources.

Clause 48. The device of clause 47, wherein the combining the at least two of the one or more audio sources is by at least one of mixing or interpolation.

Clause 49. The device of any combination of clauses 39-48, further comprising means for displaying the image data.

Clause 50. The device of clause 49, further comprising means for receiving a voice command embedded in an audio stream from a microphone and means for controlling the display device based on the voice command.

Clause 51. The device of any combination of clauses 39-50, further comprising means for playing the plurality of audio streams.

Clause 52. The device of any combination of clauses 39-51, wherein the device comprises a mobile handset.

Clause 53. The device of any combination of clauses 39-49, wherein the device comprises an extended reality headset; and wherein an acoustical space comprises a scene represented by video data captured by a camera.

Clause 54. The device of any combination of clauses 39-49, wherein the device comprises an extended reality headset; and wherein an acoustical space comprises a virtual world.

Clause 55. The device of any combination of clauses 39-54, further comprising means for presenting an acoustical space upon a head-mounted device.

Clause 56. The device of any combination of clauses 39-55, further comprising means for receiving a wireless signal.

Clause 57. The device of clause 56, wherein the wireless signal conforms to a personal area network standard.

Clause 57.5 The device of clause 57, wherein the personal area network standard comprises an AptX standard.

Clause 58. The device of clause 56, wherein the wireless signal conforms to fifth generation (5G) cellular protocol.

Clause 58.1. The device of any combination of clauses 39-58, wherein the means for analyzing image data comprises means for computer vision.

Clause 58.2. The device of any combination of clauses 39-58.1, wherein the means for analyzing image data comprises means for machine learning.

Clause 58.3. The device of any combination of clauses 39-58.2, wherein the device comprises a decoder.

Clause 58.4. The device of any combination of clauses 39-58.3, wherein the device comprises an encoder.

Clause 59. A non-transitory computer-readable storage medium having stored thereon instructions that, when executed, cause one or more processors to: store a one or more priority values each one or more priority values associated with a type of image object associated with the image data; associate image objects in the image data with the one or more audio sources in one or more audio streams; assign a respective priority value to each of the one or more audio sources in the one or more audio streams; and code ambisonic coefficients based on the assigned priority value.

Clause 60. The non-transitory computer-readable storage medium of clause 59, wherein the instructions further cause the one or more processors to spatially map the one or more audio sources in the one or more audio streams to the image objects.

Clause 61. The non-transitory computer-readable storage medium of clause 60, wherein the location information comprises a theta angle and a phi angle for each audio source.

Clause 62. The non-transitory computer-readable storage medium of any combination of clauses 60-61, wherein the location information further comprises a V-vector for each audio source and the instructions, when executed, further cause the one or more processors to match the spatially mapped audio sources with the V-vectors.

Clause 63. The non-transitory computer-readable storage medium of clause 62, wherein the instructions, when executed, further cause the one or more processors to match the spatially mapped audio sources with the V-vectors only in a foreground.

Clause 64. The non-transitory computer-readable storage medium of any combination of clauses 62-63, wherein the instructions, when executed, further cause the one or more processors to modify the V-vectors to differentiate a signal to noise ratio for at least two of the one or more audio sources when the at least two of the one or more audio sources are coded.

Clause 65. The non-transitory computer-readable storage medium of any combination of clauses 59-64, wherein the code ambisonic coefficients codes more bits for higher priority value audio sources than for lower priority value audio sources.

Clause 65.1 The non-transitory computer-readable storage medium of any combination of clauses 59-65, wherein the instructions, when executed, cause one or more processors to code a number of ambisonic coefficients based on the assigned priority value and an available resource.

Clause 65.2 The non-transitory computer-readable storage medium of clause 65.1, wherein the available resource is a battery power level.

Clause 66. The non-transitory computer-readable storage medium of any combination of clauses 59-65, wherein the instructions, when executed, cause one or more processors to output the one or more audio sources to one or more speakers.

Clause 67. The non-transitory computer-readable storage medium of any combination of clauses 59-66, wherein the instructions, when executed, cause one or more processors to combine at least two of the one or more audio sources.

Clause 68. The non-transitory computer-readable storage medium of clause 67, wherein the instructions, when executed, cause one or more processors to combine the at least two of the one or more audio sources by at least one of mixing or interpolation.

Clause 69. The non-transitory computer-readable storage medium of any combination of clauses 59-68, wherein the instructions, when executed, cause one or more processors to control a display device based upon a voice command embedded in an audio stream.

Clause 70. The non-transitory computer-readable storage medium of any combination of clauses 59-69, wherein an acoustical space comprises a scene represented by video data captured by a camera.

Clause 71. The non-transitory computer-readable storage medium of any combination of clauses 59-69, wherein an acoustical space comprises a virtual world.

Clause 72. The non-transitory computer-readable storage medium of any combination of clauses 59-71, wherein the instructions, when executed, cause one or more processors to present an acoustical space on a mobile handset.

Clause 73. The non-transitory computer-readable storage medium of any combination of clauses 59-72, wherein the instructions, when executed, cause one or more processors to present an acoustical space on a head-mounted device.

Clause 74. The non-transitory computer-readable storage medium of any combination of clauses 59-73, wherein the instructions, when executed, cause one or more processors to receive a wireless signal.

Clause 75. The non-transitory computer-readable storage medium of clause 74, wherein the wireless signal conforms to a personal area network standard.

Clause 75.5 The device of clause 75, wherein the personal area network standard comprises an AptX standard.

Clause 76. The non-transitory computer-readable storage medium of clause 74, wherein the wireless signal conforms to fifth generation (5G) cellular protocol.

Clause 77. The non-transitory computer-readable storage medium of any combination of clauses 59-76, wherein the instructions, when executed, cause one or more processors to analyze the image data through computer vision.

Clause 78. The non-transitory computer-readable storage medium of any combination of clauses 59-77, wherein the instructions, when executed, cause one or more processors to analyze the image data through machine learning.

Clause 79. The non-transitory computer-readable storage medium of any combination of clauses 59-78, wherein the instructions, when executed, cause one or more processors to code the ambisonic coefficients by decoding the ambisonic coefficients.

Clause 80. The non-transitory computer-readable storage medium of any combination of clauses 59-79, wherein the instructions, when executed, cause one or more processors to code the ambisonic coefficients by encoding the ambisonic coefficients.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic objects.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for obtaining image data, the device comprising:
a memory configured to store one or more priority values, each of the one or more priority values being associated with a type of image object associated with the image data and
one or more processors coupled to the memory, and configured to:
associate image objects in the image data with one or more audio sources represented in one or more audio streams;
spatially map the one or more audio sources represented in the one or more audio streams to the associated image objects;
store location information for each of the one or more audio sources, the location information comprising a respective theta angle and a phi angle;
assign a respective priority value to each of the one or more audio sources represented in the one or more audio streams; and
code ambisonic coefficients based on the assigned priority value.

2. The device of claim 1, wherein the location information further comprises a V-vector for each audio source and one or more processors are further configured to match the spatially mapped audio sources with the V-vectors.

3. The device of claim 2, wherein the one or more processors are further configured to match the spatially mapped audio sources with the V-vectors only in a foreground.

4. The device of 2, wherein the one or more processors are further configured to modify the V-vectors to differentiate a signal to noise ratio for at least two of the one or more audio sources represented in the one or more audio streams when the at least two of the one or more audio sources are coded.

5. The device of claim 1, wherein the one or more processors are further configured to code more bits for higher priority value audio sources than for lower priority value audio sources.

6. The device of claim 1, wherein the one or more processors are further configured to code a number of ambisonic coefficients based on the assigned priority value and an available resource.

7. The device of claim 6, wherein the available resource is a battery power level.

8. The device of claim 1, wherein the one or more processors are further configured to combine at least two of the one or more audio sources represented in the one or more audio streams by at least one of mixing or interpolation.

9. The device of claim 1, wherein the device comprises a mobile handset.

10. The device of claim 1,
wherein the device comprises an extended reality headset, and
wherein an acoustical space comprises a scene represented by video data captured by a camera.

11. The device of claim 1,
wherein the device comprises an extended reality headset, and
wherein an acoustical space comprises a virtual world.

12. The device of claim 1, further comprising a head-mounted device configured to present an acoustical space.

13. A method of obtaining image data comprising:
storing, in a memory, one or more priority values, each of the one or more priority values being associated with a type of image object associated with the image data;
associating, by one or more processors, image objects in the image data with one or more audio sources represented in one or more audio streams;
spatially mapping, by the one or more processors, the one or more audio sources represented in the one or more audio streams to the associated image objects;
storing, in the memory, location information for each of the one or more audio sources, the location information comprising a respective theta angle and a phi angle
assigning, by the one or more processors, a respective priority value to each of the one or more audio sources represented in the one or more audio streams; and
coding, by the one or more processors, ambisonic coefficients based on the assigned priority value.

14. The method of claim 13, wherein the location information further comprises a V-vector for each audio source and the method further comprises matching the spatially mapped audio sources with the V-vectors.

15. The method of claim 14, further comprising matching the spatially mapped audio sources with the V-vectors only in a foreground.

16. The method of claim 14, further comprising modifying the V-vectors to differentiate a signal to noise ratio for at least two of the one or more audio sources represented in the one or more audio streams when the at least two of the one or more audio streams are coded.

17. The method of claim 13, wherein the coding codes more bits for higher priority value audio sources than for lower priority value audio sources.

18. The method of claim 13, wherein the coding is based upon the assigned priority value and an available resource.

19. The method of claim 18, wherein the available resource is a battery power level.

20. The method of claim 13, further comprising combining, by the one or more processors, at least two of the one or more audio sources represented in the one or more audio streams by at least one of mixing or interpolation.

21. The method of claim 13, wherein an acoustical space comprises a scene represented by video data captured by a camera.

22. The method of claim 13, wherein an acoustical space comprises a virtual world.

23. The method of claim 13, further comprising presenting an acoustical space upon a head-mounted device.

24. The method of claim 13, wherein the method is performed on a mobile handset.

25. A device configured to obtain image data, the device comprising:
means for storing one or more priority values, each of the one or more priority values being associated with a type of image object associated with the image data;
means for associating image objects in the image data with one or more audio sources represented in one or more audio streams;
means for spatially mapping the one or more audio sources represented in the one or more audio streams to the associated image objects;
means for storing location information for each of the one or more audio sources, the location information comprising a respective theta angle and a phi angle;
means for assigning a respective priority value to each of the one or more audio sources represented in the one or more audio streams; and
means for coding ambisonic coefficients based on the assigned priority value.

26. A non-transitory computer-readable storage medium having stored thereon instructions that, when executed, cause one or more processors to:
store a one or more priority values, each of the one or more priority values being associated with a type of image object associated with image data;
associate image objects in the image data with one or more audio sources represented in one or more audio streams;
spatially map the one or more audio sources represented in the one or more audio streams to the associated image objects;
store location information for each of the one or more audio sources, the location information comprising a respective theta angle and a phi angle;
assign a respective priority value to each of the one or more audio sources represented in the one or more audio streams; and
code ambisonic coefficients based on the assigned priority value.

* * * * *